US00RE44353E

(19) United States
(12) Reissued Patent
Mirtich et al.

(10) Patent Number: US RE44,353 E
(45) Date of Reissued Patent: Jul. 9, 2013

(54) SYSTEM AND METHOD FOR ASSIGNING ANALYSIS PARAMETERS TO VISION DETECTOR USING A GRAPHICAL INTERFACE

(75) Inventors: Brian V. Mirtich, Phoenix, AZ (US); Andrew Eames, Ashland, MA (US); Brian S. Phillips, Sherborn, MA (US); Robert J. Tremblay, II, Grafton, MA (US); John F. Keating, Medway, MA (US); Steven Whitman, Danville, NH (US)

(73) Assignee: Cognex Technology and Investment Corporation, Mountain View, CA (US)

(21) Appl. No.: 12/931,504

(22) Filed: Dec. 22, 2010

Related U.S. Patent Documents

Reissue of:

(64) Patent No.: 7,636,449
Issued: Dec. 22, 2009
Appl. No.: 10/987,497
Filed: Nov. 12, 2004

(51) Int. Cl.
*G06K 9/00* (2006.01)

(52) U.S. Cl.
USPC ..... 382/100; 382/103; 382/141; 382/145; 382/152; 382/199; 345/650; 345/661

(58) Field of Classification Search
USPC ..... 382/100, 103, 107, 141, 145, 152, 382/199, 266; 345/619, 650, 661, 676
See application file for complete search history.

(56) References Cited

U.S. PATENT DOCUMENTS 4,214,265 A 7/1980 Olesen
4,292,666 A 9/1981 Hill et al.
4,384,195 A 5/1983 Nosler (Continued)

FOREIGN PATENT DOCUMENTS

DE 10012715 9/2000
DE 2309078 2/2002

(Continued)

OTHER PUBLICATIONS

PCT/US2008/083191, Search Report, Feb. 17, 2009.

(Continued)

*Primary Examiner* — Yosep Kassa

(57) ABSTRACT

This invention provides a system and method for automating the setup of Locators and Detectors within an image view of an object on the HMI of a vision detector by determining detectable edges and best fitting the Locators and Detectors to a location on the object image view following the establishment of an user selected operating point on the image view, such as by clicking a GUI cursor. In this manner, the initial placement and sizing of the graphical elements for Locator and Detector ROIs are relatively optimized without excessive adjustment by the user. Locators can be selected for direction, including machine or line-movement direction, cross direction or angled direction transverse to cross direction and movement direction. Detectors can be selected based upon particular analysis tools, including brightness tools, contrast tools and trained templates. The Locators and detectors are each associated with a particular set of operating parameters, such as activation threshold, which are displayed in a control box within the GUI (and can be accessed by clicking on the specific Locator or Detector. A parameter bar can also be provided adjacent to the depiction of the Detector on the image view for easy reference. Both Locators and Detectors may be manually readjusted once automatically placed and sized by drag and drop techniques.

38 Claims, 22 Drawing Sheets

U.S. PATENT DOCUMENTS

| | | | | |
|---|---|---|---|---|
| 4,647,979 | A | 3/1987 | Urata | |
| 4,847,772 | A | 7/1989 | Michalopoulos et al. | |
| 4,916,640 | A | 4/1990 | Gasperi | |
| 4,953,841 | A * | 9/1990 | Polarek | 270/52.02 |
| 4,962,538 | A | 10/1990 | Eppler et al. | |
| 4,972,494 | A | 11/1990 | White et al. | |
| 5,018,213 | A | 5/1991 | Sikes | |
| 5,040,056 | A | 8/1991 | Sager et al. | |
| 5,121,201 | A | 6/1992 | Seki | |
| 5,146,510 | A | 9/1992 | Cox et al. | |
| 5,164,998 | A | 11/1992 | Reinsch et al. | |
| 5,177,420 | A | 1/1993 | Wada | |
| 5,184,217 | A * | 2/1993 | Doering | 348/88 |
| 5,198,650 | A | 3/1993 | Wike et al. | |
| 5,210,798 | A | 5/1993 | Ekchian et al. | |
| 5,233,541 | A | 8/1993 | Corwin et al. | |
| 5,262,626 | A | 11/1993 | Goren et al. | |
| 5,271,703 | A * | 12/1993 | Lindqvist et al. | 414/268 |
| 5,286,960 | A | 2/1994 | Longacre, Jr. et al. | |
| 5,298,697 | A | 3/1994 | Suzuki et al. | |
| 5,317,645 | A | 5/1994 | Perozek et al. | |
| 5,365,596 | A | 11/1994 | Dante et al. | |
| 5,420,409 | A | 5/1995 | Longacre, Jr. et al. | |
| 5,476,010 | A | 12/1995 | Fleming et al. | |
| 5,481,712 | A | 1/1996 | Silver et al. | |
| 5,581,625 | A | 12/1996 | Connell et al. | |
| 5,602,890 | A * | 2/1997 | Gray et al. | 378/57 |
| 5,687,249 | A | 11/1997 | Kato | |
| 5,717,834 | A | 2/1998 | Werblin et al. | |
| 5,734,742 | A | 3/1998 | Asaeda et al. | |
| 5,742,037 | A | 4/1998 | Scola et al. | |
| 5,751,831 | A | 5/1998 | Ono | |
| 5,802,220 | A | 9/1998 | Black et al. | |
| 5,809,161 | A | 9/1998 | Auty et al. | |
| 5,825,483 | A | 10/1998 | Michael et al. | |
| 5,852,669 | A | 12/1998 | Eleftheriadis et al. | |
| 5,872,354 | A | 2/1999 | Hanson | |
| 5,917,602 | A | 6/1999 | Bonewitz et al. | |
| 5,929,418 | A | 7/1999 | Ehrhart et al. | |
| 5,932,862 | A | 8/1999 | Hussey et al. | |
| 5,937,096 | A | 8/1999 | Kawai | |
| 5,942,741 | A | 8/1999 | Longacre et al. | |
| 5,943,432 | A | 8/1999 | Gilmore et al. | |
| 5,960,097 | A | 9/1999 | Pfeiffer et al. | |
| 5,960,125 | A | 9/1999 | Michael et al. | |
| 5,966,457 | A | 10/1999 | Lemelson | |
| 6,046,764 | A * | 4/2000 | Kirby et al. | 348/92 |
| 6,049,619 | A | 4/2000 | Anandan et al. | |
| 6,061,471 | A | 5/2000 | Coleman, Jr. et al. | |
| 6,072,494 | A | 6/2000 | Nguyen | |
| 6,072,882 | A * | 6/2000 | White et al. | 381/94.1 |
| 6,075,882 | A * | 6/2000 | Mullins et al. | 382/141 |
| 6,078,251 | A | 6/2000 | Landt et al. | |
| 6,088,467 | A | 7/2000 | Sarpeshkar et al. | |
| 6,115,480 | A | 9/2000 | Washizawa | |
| 6,158,661 | A | 12/2000 | Chadima, Jr. et al. | |
| 6,160,494 | A | 12/2000 | Sodi et al. | |
| 6,161,760 | A | 12/2000 | Marrs | |
| 6,169,535 | B1 | 1/2001 | Lee | |
| 6,169,600 | B1 | 1/2001 | Ludlow | |
| 6,173,070 | B1 | 1/2001 | Michael et al. | |
| 6,175,644 | B1 | 1/2001 | Scola et al. | |
| 6,175,652 | B1 | 1/2001 | Jacobson et al. | |
| 6,184,924 | B1 * | 2/2001 | Schneider et al. | 348/92 |
| 6,215,892 | B1 | 4/2001 | Douglass et al. | |
| 6,282,462 | B1 | 8/2001 | Hopkins | |
| 6,285,787 | B1 | 9/2001 | Kawachi et al. | |
| 6,298,176 | B2 | 10/2001 | Longacre, Jr. et al. | |
| 6,301,610 | B1 | 10/2001 | Ramser et al. | |
| 6,333,993 | B1 | 12/2001 | Sakamoto | |
| 6,346,966 | B1 | 2/2002 | Toh | |
| 6,347,762 | B1 | 2/2002 | Sims et al. | |
| 6,360,003 | B1 | 3/2002 | Doi et al. | |
| 6,396,517 | B1 | 5/2002 | Beck et al. | |
| 6,396,949 | B1 | 5/2002 | Nichani | |
| 6,408,429 | B1 | 6/2002 | Marrion et al. | |
| 6,429,387 | B1 * | 8/2002 | Kuribayashi et al. | 174/261 |
| 6,434,264 | B1 * | 8/2002 | Asar | 382/147 |
| 6,446,868 | B1 | 9/2002 | Robertson et al. | |
| 6,483,935 | B1 | 11/2002 | Rostami et al. | |
| 6,487,304 | B1 | 11/2002 | Szeliski | |
| 6,525,810 | B1 * | 2/2003 | Kipman | 356/237.1 |
| 6,526,156 | B1 | 2/2003 | Black et al. | |
| 6,539,107 | B1 | 3/2003 | Michael et al. | |
| 6,545,705 | B1 | 4/2003 | Sigel et al. | |
| 6,549,647 | B1 | 4/2003 | Skunes et al. | |
| 6,573,929 | B1 | 6/2003 | Glier et al. | |
| 6,580,810 | B1 | 6/2003 | Yang et al. | |
| 6,587,122 | B1 | 7/2003 | King et al. | |
| 6,597,381 | B1 | 7/2003 | Eskridge et al. | |
| 6,608,930 | B1 | 8/2003 | Agnihotri et al. | |
| 6,618,074 | B1 | 9/2003 | Seeley et al. | |
| 6,625,317 | B1 | 9/2003 | Gaffin et al. | |
| 6,628,805 | B1 | 9/2003 | Hansen et al. | |
| 6,629,642 | B1 | 10/2003 | Swartz et al. | |
| 6,646,244 | B2 | 11/2003 | Aas et al. | |
| 6,668,075 | B1 | 12/2003 | Nakamura | |
| 6,677,852 | B1 | 1/2004 | Landt | |
| 6,681,151 | B1 | 1/2004 | Weinzimmer et al. | |
| 6,714,213 | B1 * | 3/2004 | Lithicum et al. | 715/701 |
| 6,741,977 | B1 | 5/2004 | Nagaya et al. | |
| 6,750,974 | B2 * | 6/2004 | Svetkoff et al. | 356/602 |
| 6,753,876 | B2 | 6/2004 | Brooksby et al. | |
| 6,754,374 | B1 * | 6/2004 | Miller et al. | 382/128 |
| 6,761,316 | B2 | 7/2004 | Bridgelall | |
| 6,766,414 | B2 | 7/2004 | Francis et al. | |
| 6,774,917 | B1 | 8/2004 | Foote et al. | |
| 6,795,521 | B2 * | 9/2004 | Hsu et al. | 378/4 |
| 6,816,063 | B2 | 11/2004 | Kubler | |
| 6,817,982 | B2 * | 11/2004 | Fritz et al. | 600/443 |
| 6,891,570 | B2 | 5/2005 | Tantalo et al. | |
| 6,901,277 | B2 * | 5/2005 | Kaufman et al. | 600/407 |
| 6,919,793 | B2 | 7/2005 | Heinrich | |
| 6,944,584 | B1 | 9/2005 | Tenney et al. | |
| 6,985,827 | B2 | 1/2006 | Williams et al. | |
| 6,987,528 | B1 | 1/2006 | Nagahisa et al. | |
| 6,997,556 | B2 | 2/2006 | Pfleger | |
| 6,999,625 | B1 | 2/2006 | Nelson | |
| 7,062,071 | B2 | 6/2006 | Tsujino et al. | |
| 7,066,388 | B2 | 6/2006 | He | |
| 7,070,099 | B2 | 7/2006 | Patel | |
| 7,085,401 | B2 | 8/2006 | Averbuch et al. | |
| 7,088,387 | B1 | 8/2006 | Freeman et al. | |
| 7,088,846 | B2 | 8/2006 | Han et al. | |
| 7,097,102 | B2 | 8/2006 | Patel et al. | |
| 7,130,457 | B2 * | 10/2006 | Kaufman et al. | 382/128 |
| 7,175,090 | B2 | 2/2007 | Nadabar | |
| 7,181,066 | B1 | 2/2007 | Wagman | |
| 7,227,925 | B1 * | 6/2007 | Mansfield et al. | 378/65 |
| 7,227,978 | B2 | 6/2007 | Komatsuzaki et al. | |
| 7,266,768 | B2 | 9/2007 | Ferlitsch et al. | |
| 7,274,808 | B2 | 9/2007 | Baharav et al. | |
| 7,280,685 | B2 | 10/2007 | Beardsley et al. | |
| 7,611,358 | B2 * | 11/2009 | Cox et al. | 439/65 |
| 7,657,081 | B2 | 2/2010 | Blais et al. | |
| 7,734,008 | B1 * | 6/2010 | Sanders et al. | 378/57 |
| 7,787,678 | B2 * | 8/2010 | Unal et al. | 382/128 |
| 8,049,193 | B1 * | 11/2011 | Appleby et al. | 250/505.1 |
| 8,194,821 | B2 * | 6/2012 | Seppi et al. | 378/62 |
| 2001/0042789 | A1 | 11/2001 | Krichever et al. | |
| 2002/0005895 | A1 | 1/2002 | Freeman et al. | |
| 2002/0099455 | A1 | 7/2002 | Ward | |
| 2002/0122582 | A1 | 9/2002 | Masuda et al. | |
| 2002/0177918 | A1 | 11/2002 | Pierel et al. | |
| 2002/0181405 | A1 | 12/2002 | Ying | |
| 2002/0196336 | A1 | 12/2002 | Batson et al. | |
| 2002/0196342 | A1 | 12/2002 | Walker et al. | |
| 2003/0062418 | A1 | 4/2003 | Barber et al. | |
| 2003/0095710 | A1 | 5/2003 | Tessadro | |
| 2003/0113018 | A1 | 6/2003 | Nefian et al. | |
| 2003/0120714 | A1 | 6/2003 | Wolff et al. | |
| 2003/0137590 | A1 | 7/2003 | Barnes et al. | |
| 2003/0201328 | A1 | 10/2003 | Jam et al. | |
| 2003/0219146 | A1 | 11/2003 | Jepson et al. | |
| 2003/0227483 | A1 | 12/2003 | Schultz et al. | |
| 2004/0148057 | A1 | 7/2004 | Breed et al. | |
| 2004/0218806 | A1 | 11/2004 | Miyamoto et al. | |

| | | | |
|---|---|---|---|
| 2005/0184217 | A1 | 8/2005 | Kong et al. |
| 2005/0226490 | A1 | 10/2005 | Phillips et al. |
| 2005/0254106 | A9 | 11/2005 | Silverbrook et al. |
| 2005/0257646 | A1 | 11/2005 | Yeager |
| 2005/0275728 | A1 | 12/2005 | Mirtich et al. |
| 2005/0275831 | A1 | 12/2005 | Silver |
| 2005/0275833 | A1 | 12/2005 | Silver |
| 2005/0275834 | A1 | 12/2005 | Silver |
| 2005/0276445 | A1 | 12/2005 | Silver et al. |
| 2005/0276459 | A1 | 12/2005 | Eames et al. |
| 2005/0276460 | A1 | 12/2005 | Silver et al. |
| 2005/0276461 | A1 | 12/2005 | Silver et al. |
| 2005/0276462 | A1 | 12/2005 | Silver et al. |
| 2006/0022052 | A1 | 2/2006 | Patel et al. |
| 2006/0107211 | A1 | 5/2006 | Mirtich et al. |
| 2006/0107223 | A1 | 5/2006 | Mirtich et al. |
| 2006/0131419 | A1 | 6/2006 | Nunnink |
| 2006/0133757 | A1 | 6/2006 | Nunnink |
| 2006/0146337 | A1 | 7/2006 | Marshall et al. |
| 2006/0223628 | A1 | 10/2006 | Walker et al. |
| 2006/0249581 | A1 | 11/2006 | Smith et al. |
| 2006/0283952 | A1 | 12/2006 | Wang |
| 2007/0009152 | A1 | 1/2007 | Kanda |
| 2007/0146491 | A1 | 6/2007 | Tremblay et al. |
| 2007/0181692 | A1 | 8/2007 | Barkan et al. |
| 2008/0036873 | A1 | 2/2008 | Silver |
| 2008/0166015 | A1 | 7/2008 | Haering et al. |
| 2008/0167890 | A1 | 7/2008 | Pannese et al. |
| 2008/0205714 | A1 | 8/2008 | Benkley |
| 2008/0219521 | A1 | 9/2008 | Benkley |
| 2008/0285802 | A1 | 11/2008 | Bramblet et al. |
| 2010/0318936 | A1 | 12/2010 | Tremblay et al. |

FOREIGN PATENT DOCUMENTS

| | | |
|---|---|---|
| DE | 10040563 | 2/2002 |
| EP | 0815688 | 1/1998 |
| EP | 0939382 | 9/1999 |
| EP | 0815688 | 5/2000 |
| EP | 0896290 | 10/2004 |
| EP | 1469420 | 10/2004 |
| EP | 1734456 | 12/2006 |
| GB | 2226130 | 6/1990 |
| JP | 60147602 | 8/1985 |
| JP | 9-288060 | 11/1997 |
| JP | 11-101689 | 4/1999 |
| JP | 2000-84495 | 3/2000 |
| JP | 2000-227401 | 8/2000 |
| JP | 2000-322450 | 11/2000 |
| JP | 2002-148205 | 5/2002 |
| WO | WO-9609597 | 3/1996 |
| WO | WO-0141068 | 6/2001 |
| WO | WO-0215120 | 2/2002 |
| WO | WO-02075637 | 9/2002 |
| WO | WO-03102859 | 12/2003 |
| WO | WO-2005050390 | 6/2005 |
| WO | WO-2005124709 | 12/2005 |

OTHER PUBLICATIONS

Response to Written Opinion, Singapore patent No. 200608484-2, Dec. 11, 2009.

Prosecution file history for U.S. Appl. No. 10/865,155, Jun. 9, 2004 through Jan. 10, 2011.

Prosecution file history for U.S. Appl. No. 10/979,535, Nov. 2, 2004 through 1/29/09.

Prosecution file history for U.S. Appl. No. 10/979,572, Nov. 2, 2004 through Jan. 11, 2001.

Prosecution file history for U.S. Appl. No. 10/987,497, Oct. 2, 2008 through Mar. 30, 2009.

Prosecution file history for U.S. Appl. No. 10/988,120, Nov. 12, 2004 through Dec. 31, 2009.

Prosecution file history for U.S. Appl. No. 11/059,512, Feb. 16, 2005 through Dec. 18, 2008.

Non-Final Office Action for U.S. Appl. No. 11/094,650, dated Jan. 28, 2009.

Prosecution file history for U.S. Appl. No. 11/136,019, May 24, 2005 through Oct. 29, 2010.

Prosecution file history for U.S. Appl. No. 11/136,103, May 24, 2005 through Dec. 18, 2009.

Prosecution file history for U.S. Appl. No. 11/138,033, Jun. 27, 2007 through Oct. 25, 2007.

Prosecution file history for U.S. Appl. No. 11/138,025, May 26, 2005, through Jan. 17, 2009.

Prosecution file history for U.S. Appl. No. 11/616,726, Dec. 27, 2006 through Aug. 20, 2010.

Prosecution file history for U.S. Appl. No. 11/769,494, Jun. 27, 2007 through Oct. 25, 2007.

European Patent application No. 05758781, file history Feb. 18, 2006 through Mar. 25, 2009.

PCT/US2005/019923 International Preliminary Report on Patentability, May 12, 2006.

European Patent application No. 05763341, file history Jun. 13, 2007 through Sep. 20, 2010.

Japanese Patent application No. 2007-527,637, Office action English translation, dated May 25, 2010.

Japanese Patent Application 2007-527 637, Response to Office action dated, Sep. 1, 2010, English translation.

European Patent application No. 05756516, file history Feb. 23, 2006 through Feb. 10, 2009.

International Preliminary Report on Patentability, PCT/US2008/007280 Publication Date Dec. 17, 2009.

International Search Report, PCT/US20081007302, Publication Date Nov. 5, 2009.

Written Opinion of the International Searching Authority PCT/US2008/007302, Publication Date Nov. 5, 2009.

Written Opinion of the International Searching Authority, PCT/US2008/007280, Publication Date Dec. 15, 2009.

Apple Computer Inc., Studio Display User's Manual online, retrieved on Nov. 24, 2010, retrieved from the Internet http://manuals.info.apple.com/en/studioDisplay_15inLCDUserManual.pdf, 1998.

Search Report, PCT/US2008/083191, Publication Date Feb. 17, 2009.

Cognex Corporation, VisionPro Getting Started, Revision 3.2, 590-6508, copyright 2003.

National Instruments, IMAQVision Builder Tutorial, IMAQ XP-002356530, b, ttp://www.ni.com.'pdf,'manuals/322228c.pdf, Publication Date, Dec. 2000.

Allen-Bradley, Bulletin 2803 VIM Vision Input Module, Cat. No. 2803-VIM2, Printed USA, (1991) (Submitted in 3 parts).

Allen-Bradley, Bulletin 5370 CVIM Configurable Vision Input Module, User Manual Cat. No. 5370-CVIM, (1995) (Submitted in 3 parts).

Allen-Bradley, User's Manual, Bulletin 2803 VIM Vision Input Module, Cat. No. 2803-VIM1, (1987) (Submitted in 2 parts).

Cognex Corporation, Screen shot of the CheckMate GUI Ver 1.6, (Jan. 2005).

Cognex Corporation, Sensorpart FA45 Vision Sensor, (Sep. 29, 2006).

Cognex Corporation, 3000/4000/5000 Vision Tools, revision 7.6, 590-0136, Chapter 13, (1996).

Cognex Corporation, Cognex 3000/4000/5000, Vision Tools, Revision 7.6, 590-0136, Chapter 10 Auto-Focus, (1996).

Vietze, Oliver Miniaturized Vision Sensors for Process Automation, (Jan. 2, 2005).

"Cognex 3000/4000/5000 Image Processing", *Revision 7.4 590-0135 Edge Detection Tool,* (1996).

"Cognex 4000/5000 SMD Placement Guidance Package, User's Manual" *Release 3.8.00, Chapter 15,* 590-6168,(1998).

"Cognex VisionPro", *Getting Started—QuickStart Tutorial,* Cognex Corporation, 590-6560, Revision 3.5,(May 2004),69-94.

"CVL Vision Tools Guide", *Cognex MVS-8000 Series,* Chapter 5, Symbol Tool, CVL 5.4,(Dec. 1999).

Demotte, Donald, "Visual Line Tracking", *Application Overview & Issues Machine Vision for Robot Guidance Workshop,* (May 5, 2004).

Shane C. Hunt, Mastering Microsoft PhotoDraw 2000, SYBEX, Inc., May 21, 1999.

Integrated Design Tools, High-Speed CMOS Digital Camera, X-Stream Vision User's Manual, 2000.

IO Industries, High Speed Digital Video Recording Software 4.0,IO industries, Inc.—Ontario, CA, 2002.
Phillip Kahn, Building Blocks for Computer Vision Systems, IEEE Expert, vol. 8, No. 6, XP002480004, pp. 40-50, Dec. 6, 1993.
Matrox, Interactive Windows Imaging Software for Industrial and Scientific Applications, Inspector 4.0—Matrox Imaging, pp. 8, Apr. 15, 2002.
Olympus Industrial, Design Philosophy, i-speed, 2002.
Olympus Industrial High Speed, High Quality Imaging Systems, i-speed Product Brochure—Publisher Olympus Industrial, 2002.
RVSI, Smart Camera Reader for Directly Marked Data Matrix Codes, HawkEye 1515 with GUI, 2004.
Whelan, P. et al., Machine Vision Algorithms in Java, Chapter 1—An Introduction to Machine Vision, Springer-Verlag, XP002480005, 2001.
Photron, USA, Product information for Fastcam-X 1280 PCI, Copyright 2004, www.photron.com.
Photron, USA, Product information for Fastcam PCI, Copyright 2004, www.photron.com.
Photron, USA, Product information for Ultima 1024, Copyright 2004, www.photron.com.
Photron, USA, Product information for Ultima 512, Copyright 2004, www.photron.com.
Photron, USA, Product information for Ultima APX, Copyright 2004, www.photron.com.
KSV Instruments Ltd., HiSIS 2002—High Speed Imaging System, www.ksvltd.fi, 2004.
ICS 100, Intelligent Camera Sensor, SICK Product Information, SICK Industrial Sensors, 6900 West 110th St., Minneapolis, MN 55438, www.sickusa.com, Jan. 3, 2002.
Matsushita Imagecheckers, NAiS Machine Vision, Matsushita Machine Vision Systems, 2003.
Rohr, K., Incremental Recognition of Pedestrians from Image Sequences, CVPR93, 1993.
Chang, Dingding et al., Feature Detection of Moving Images using a Hierarchical Relaxation Method, IEICE Trans. Inf. & Syst., vol. E79-D, Jul. 7, 1996.
Zarandy, A. et al., Vision Systems Based on the 128X128 Focal Plane Cellular Visual Microprocessor Chips, IEEE, Mar. 2003, III-518—III-521.
SmartCapture Tool, Feature Fact Sheet, Visionx Inc., www.visionxinc.com, 2003.
Wilson, Andrew, CMOS/CCD sensors spot niche applications, Vision Systems, 2003.
Matsushita LightPix AE10, NAiS Machine Vision, Matsushita Machine Vision Systems, 2003.
Corke, Peter I., et al., Real Time Industrial Machine Vision, Electrical Engineering Congress Sydney, Australia, CSIRO Division of Manufacturing Technology, 1994.
Marsh, R et al., The application of Knowledge based vision to closed-loop control of the injection molding process, SPIE vol. 3164, Faculty of Engineering University of the West of England United Kingdom, 1997, pp. 605-616.
Zarandy, Akos et al., Ultra-High Frame Rate Focal Plane Image Sensor and Processor, IEEE Sensors Journal, vol. 2, No. 6, 2002.
LM9630 100×128, 580 fps UltraSensitive Monochrome CMOS Image Sensor, National Semiconductor Corp., www.national.com, Rev. 1.0, Jan. 2004.
Analog Devices, Inc., Blackfin Processor Instruction Set Reference, Revision 2.0, Part No. 82-000410-14, May 2003.
ADSP-BF533 Blackfin Processor Hardware Reference, Analog Devices Inc., Media Platforms and Services Group, Preliminary Revision, Part No. 82-002005-01, Mar. 2003.
National Instruments, IMAQVision Builder Tutorial, IMAQ XP-002356530, http://www.ni.com/pdf/manuals/322228c.pdf, Dec. 2000.
Denis, Jolivet, LabView and IMAQ Vision Builder Provide Automated Visual Builder, LabVIEW, National Instruments, XP002356529, http://www.ni.com/pdf/csma/us/JNDESWG.pdf, 2001.
Chen, Y.H., Computer vision for General Purpose Visual Inspection: a Fuzzy Logic Approach, Optics and Lasers in Engineering 22, Elsevier Science Limited, vol. 22, No. 3, 1995, pp. 182-192.
Di Mauro, E.C., et al., Check a generic and specific industrial inspection tool, IEEE Proc.-Vis. Image Signal Process, vol. 143, No. 4, Aug. 27, 1996, pp. 241-249.
Uno, T. et al., A Method of Real-Time Recognition of Moving Objects and its Application, Pattern Recognition: Pergamon Press, vol. 8, pp. 201-208, 1976.
Hearing, N., et al., Visual Event Detection, Kluwer Academic Publishers, Chapter 2, Section 8, 2001.
IBM, Software Controls for Automated Inspection Device Used to Check Interposer Buttons for Defects, IP.com Journal, IP.com Inc., West Henrietts, NY US, Mar. 27, 2003.
Wright, Anne, et al, Cognachrome Vision System User's Guide, Newton Research Labs, Manual Edition 2.0, Documents Software Version 26.0, Jun. 3, 1996.
Stemmer Imaging GmbH, Going Multimedia with Common Vision Blox, Product News, www.stemmer-imaging.de, Mar. 3, 2004.
Cordin Company, Electronic Imaging Systems, High Speed Imaging Solutions: 200-500 Series Cameras, www.cordin.com, 2004.
Bi-i, AnaLogic Computers Ltd., 2003.
Bi-i, Bio-inspired Real-Time Very High Speed Image Processing Systems, AnaLogic Computers Ltd., http://www.analogic-computers.com/cgi-bin/phprint21.php, 2004.
Cellular device processes at ultrafast speeds, VisionSystems Design, Feb. 2003.
LaVision GmbH, High Speed CCD/CMOS Camera Systems, Overview of State of-the-Art High Speed Digital Camera Systems, UltraSpeedStar, www.lavision.de, Sep. 24, 2004.
10-K SEC Filing, iQ 180 Products, Adaptive Optics Associates 900 Coles Road, Blackwood, NJ 08012-4683, Dec. 2003.
Laser Scanning Product Guide, Adaptive Optics Associates, Industrial Products and Systems, 900 Coles Road, Blackwood, NJ 08012-4683, Industrial Holographic and Conventional Laser ID, Omnidirectional Bar Code Scanners, Mar. 2003.
CV-2100 Series, Keyence America, http://www.keyence.com/products/vision/cv_2100_spec.html, High-Speed Digital Machine Vision System, Dec. 29, 2003.
West, Perry C., High-Speed, Real-Time Machine Vision, Imagenation and Automated Vision Systems, Inc., 2001.
Asundi, A., et al., High-Speed TDI Imaging for Peripheral Inspection, Proc. SPIC vol. 2432, Machine Vision Applications in Industrial Inspection III, Frederick Y. Wu, Stephen S. Wilson, Eds., Mar. 1995, pp. 189-194.
Baillard, C., et al., Automatic Reconstruction of Piecewise Planar Models from Multiple Views, CVPR, vol. 02, No. 2, 1999, pp. 2559.
Kim, Zuwhan et al., Automatic Description of Complex Buildings with Multiple Images, IEEE 0-7695-0813, 2000, pp. 155-162.
Siemens AG, Simatic Machine Vision, Simatic VS 100 Series, www.siemens.com/machine-vision, Apr. 1, 2003.
Stauffer, Chris et al., Tracking-Based Automatic Object Recognition, Artificial Intelligence Laboratory, Massachusetts Institute of Technology, Cambridge, MA http://www.ai.mit.edu, pp. 133-134.
Bauberg, A.M. et al., Learning Flexible Models from Image Sequences, University of Leeds, School of Computer Studies, Research Report Series, Report 93.36, Oct. 1993, pp. 1-13.

* cited by examiner

500

| | | | | | | | | | | | | | | | |
|---|---|---|---|---|---|---|---|---|---|---|---|---|---|---|---|
| | | | | 57 | 59 | 60 | 60 | 59 | 57 | | | | | | |
| | | | 57 | 61 | 64 | 67 | 68 | 68 | 67 | 64 | 61 | 57 | | | |
| | | 58 | 63 | 68 | 72 | 74 | 75 | 75 | 74 | 72 | 68 | 63 | 58 | | |
| | 57 | 63 | 69 | 74 | 78 | 81 | 83 | 83 | 81 | 78 | 74 | 69 | 63 | 57 | |
| | 61 | 68 | 74 | 80 | 84 | 87 | 89 | 89 | 87 | 84 | 80 | 74 | 68 | 61 | |
| 57 | 64 | 72 | 78 | 84 | 89 | 92 | 93 | 93 | 92 | 89 | 84 | 78 | 72 | 64 | 57 |
| 59 | 67 | 74 | 81 | 87 | 92 | 95 | 97 | 97 | 95 | 92 | 87 | 81 | 74 | 67 | 59 |
| 60 | 68 | 75 | 83 | 89 | 93 | 97 | 99 | 99 | 97 | 93 | 89 | 83 | 75 | 68 | 60 |
| 60 | 68 | 75 | 83 | 89 | 93 | 97 | 99 | 99 | 97 | 93 | 89 | 83 | 75 | 68 | 60 |
| 59 | 67 | 74 | 81 | 87 | 92 | 95 | 97 | 97 | 95 | 92 | 87 | 81 | 74 | 67 | 59 |
| 57 | 64 | 72 | 78 | 84 | 89 | 92 | 93 | 93 | 92 | 89 | 84 | 78 | 72 | 64 | 57 |
| | 61 | 68 | 74 | 80 | 84 | 87 | 89 | 89 | 87 | 84 | 80 | 74 | 68 | 61 | |
| | 57 | 63 | 69 | 74 | 78 | 81 | 83 | 83 | 81 | 78 | 74 | 69 | 63 | 57 | |
| | | 58 | 63 | 68 | 72 | 74 | 75 | 75 | 74 | 72 | 68 | 63 | 58 | | |
| | | | 57 | 61 | 64 | 67 | 68 | 68 | 67 | 64 | 61 | 57 | | | |
| | | | | 57 | 59 | 60 | 60 | 59 | 57 | | | | | | |

*Fig. 5*

SYSTEM AND METHOD FOR ASSIGNING ANALYSIS PARAMETERS TO VISION DETECTOR USING A GRAPHICAL INTERFACE

Matter enclosed in heavy brackets [ ] appears in the original patent but forms no part of this reissue specification; matter printed in italics indicates the additions made by reissue.

RELATED APPLICATION

This application is related to copending and commonly assigned U.S. patent application Ser. No. 10/865,155, entitled METHOD AND APPARATUS FOR VISUAL DETECTION AND INSPECTION OF OBJECTS, by William M. Silver, filed Jun. 9, 2004, the teachings of which are expressly incorporated herein by reference.

FIELD OF THE INVENTION

This invention relates to automated detection and inspection of objects being manufactured on a production line, and more particularly to setup systems and methods for such automated detection and inspection.

BACKGROUND OF THE INVENTION

Industrial manufacturing relies on automatic inspection of objects being manufactured. One form of automatic inspection that has been in common use for decades is based on optoelectronic technologies that use electromagnetic energy, usually infrared or visible light, photoelectric sensors, and some form of electronic decision making.

One well-known form of optoelectronic automatic inspection uses an arrangement of photodetectors. A typical photodetector has a light source and a single photoelectric sensor that responds to the intensity of light that is reflected by a point on the surface of an object, or transmitted along a path that an object may cross. A user-adjustable sensitivity threshold establishes a light intensity above which (or below which) an output signal of the photodetector will be energized.

One photodetector, often called a gate, is used to detect the presence of an object to be inspected. Other photodetectors are arranged relative to the gate to sense the light reflected by appropriate points on the object. By suitable adjustment of the sensitivity thresholds, these other photodetectors can detect whether certain features of the object, such as a label or hole, are present or absent. A decision as to the status of the object (for example, pass or fail) is made using the output signals of these other photodetectors at the time when an object is detected by the gate. This decision is typically made by a programmable logic controller (PLC), or other suitable electronic equipment.

Automatic inspection using photodetectors has various advantages. Photodetectors are inexpensive, simple to set up, and operate at very high speed (outputs respond within a few hundred microseconds of the object being detected, although a PLC will take longer to make a decision).

Automatic inspection using photodetectors has various disadvantages, however, including:

- Simple sensing of light intensity reflected from a point on the object is often insufficient for inspection. Instead it may be necessary to analyze a pattern of brightness reflected from an extended area. For example, to detect an edge it may be necessary to analyze a pattern of brightness to see if it corresponds to a transition from a lighter to a darker region.
- It may be hard to arrange the photodetectors when many points on an object need to be inspected. Each such inspection point requires the use of a separate photodetector that needs to be physically mounted in such a way as to not interfere with the placement of the other photodetectors. Interference may be due to space limitations, crosstalk from the light sources, or other factors.
- Manufacturing lines are usually capable of producing a mix of products, each with unique inspection requirements. An arrangement of photodetectors is very inflexible, so that a line changeover from one product to another would require the photodetectors to be physically moved and readjusted. The cost of performing a line changeover, and the risk of human error involved, often offset the low cost and simplicity of the photodetectors.
- Using an arrangement of photodetectors requires that objects be presented at known, predetermined locations so that the appropriate points on the object are sensed. This requirement may add additional cost and complexity that can offset the low cost and simplicity of the photodetectors.

Another well-known form of optoelectronic automatic inspection uses a device that can capture a digital image of a two-dimensional field of view (FOV) in which an object to be inspected is located, and then analyze the image and make decisions. Such a device is usually called a machine vision system, or simply a vision system. The image is captured by exposing a two-dimensional array of photosensitive elements for a brief period, called the integration or shutter time, to light that has been focused on the array by a lens. The array is called an imager and the individual elements are called pixels. Each pixel measures the intensity of light falling on it during the shutter time. The measured intensity values are then converted to digital numbers and stored in the memory of the vision system to form the image, which is analyzed by a digital processing element such as a computer, using methods well-known in the art to determine the status of the object being inspected.

In some cases the objects are brought to rest in the field of view, and in other cases the objects are in continuous motion through the field of view. An event external to the vision system, such as a signal from a photodetector, or a message from a PLC, computer, or other piece of automation equipment, is used to inform the vision system that an object is located in the field of view, and therefore an image should be captured and analyzed. Such an event is called a trigger.

Machine vision systems avoid the disadvantages associated with using an arrangement of photodetectors. They can analyze patterns of brightness reflected from extended areas, easily handle many distinct features on the object, accommodate line changeovers through software systems and/or processes, and handle uncertain and variable object locations.

Machine vision systems have disadvantages compared to an arrangement of photodetectors, including:

- They are relatively expensive, often costing ten times more than an arrangement of photodetectors.
- They can be difficult to set up, often requiring people with specialized engineering training.
- They operate much more slowly than an arrangement of photodetectors, typically requiring tens or hundreds of milliseconds to make a decision. Furthermore, the decision time tends to vary significantly and unpredictably from object to object.

Machine vision systems have limitations that arise because they make decisions based on a single image of each object, located in a single position in the field of view (each object may be located in a different and unpredictable position, but for each object there is only one such position on which a decision is based). This single position provides information from a single viewing perspective, and a single orientation relative to the illumination. The use of only a single perspective often leads to incorrect decisions. It has long been observed, for example, that a change in perspective of as little as a single pixel can in some cases change an incorrect decision to a correct one. By contrast, a human inspecting an object usually moves it around relative to his eyes and the lights to make a more reliable decision.

Also, the limitations of machine vision systems arise in part because they operate too slowly to capture and analyze multiple perspectives of objects in motion, and too slowly to react to events happening in the field of view. Since most vision systems can capture a new image simultaneously with analysis of the current image, the maximum rate at which a vision system can operate is determined by the larger of the capture time and the analysis time. Overall, one of the most significant factors in determining this rate is the number of pixels comprising the imager.

The availability of new low-cost imagers, such as the LM9630 from National Semiconductor of Santa Clara, Calif. that operate at a relatively low-resolution (approximately 100×128 pixels), high frame rate (up to 500 frames per second) and high sensitivity allowing short shutter times with inexpensive illumination (e.g., 300 microseconds with LED illumination), have made possible the implementation of a novel vision detector that employs on-board processors to control machine vision detection and analysis functions. A novel vision detector using such an imager, and overall inspection system employing such a vision detector, is taught in copending and commonly assigned U.S. patent application Ser. No. 10/865,155, entitled METHOD AND APPARATUS FOR VISUAL DETECTION AND INSPECTION OF OBJECTS, by William M. Silver, filed Jun. 9, 2004, and the teachings of which are expressly incorporated herein by reference (herein also termed "above-incorporated-by-reference METHOD AND APPARATUS).

An advantage to the above-incorporated-by-reference detection and inspection METHOD AND APPARATUS is that the vision detector can be implemented within a compact housing that is programmed using a PC or other Human-Machine Interface (HMI) device (via, for example, a Universal Serial Bus (USB)), and is then deployed to a production line location for normal runtime operation. The outputs of the apparatus are (in one implementation) a pair of basic High/Low lines indicating detection of the object and whether that object passes or fails based upon the characteristics being analyzed. These outputs can be used (for example) to reject a failed object using a rejection arm mounted along the line that is signaled by the apparatus' output.

By way of example, FIG. 1 shows an illustrative embodiment of a vision detector 100 according to the above-incorporated-by-reference METHOD AND APPARATUS FOR VISUAL DETECTION AND INSPECTION OF OBJECTS inspecting objects on a production line. A conveyor 102 transports objects to cause relative movement between the objects and the field of view (FOV) of vision detector 100. Objects 110, 112, 114, 116 and 118 are shown. In this example, the objects include exemplary features upon which location and inspection are based, including a label 120 and a hole 124. More particularly, the exemplary vision detector 100 detects the presence of an object by visual appearance and inspects it based on appropriate inspection criteria. If an object is defective (such as the label-less object 116), the vision detector 100 sends a signal via link 150 to a reject actuator 170 to remove the object (116) from the conveyor stream. An encoder 180 operatively related to the motion of the conveyor (or other relative motion) sends a signal 160 to the vision detector 100, which uses it to insure proper delay of signal 150 from the encoder count where the object crosses some fixed, imaginary reference point 190, called the mark point. If an encoder is not used, the delay can be based on time instead.

In an alternate example, the vision detector 100 sends signals to a PLC for various purposes, which may include controlling a reject actuator. In another exemplary implementation, suitable in extremely high-speed applications or where the vision detector cannot reliably detect the presence of an object, a photodetector is used to detect the presence of an object and sends a signal to the vision detector for that purpose. In yet another implementation, there are no discrete objects, but rather material flows past the vision detector continuously—for example a web. In this case the material is inspected continuously, and signals are sent by the vision detector to automation equipment, such as a PLC, as appropriate.

Basic to the function of the vision detector 100 in the above-incorporated-by-reference METHOD AND APPARATUS is the ability to exploit the abilities of the imager's quick-frame-rate and low-resolution image capture to allow a large number of image frames of an object passing down the line to be captured and analyzed in real-time. Using these frames, the apparatus' on-board processor can decide when the object is present and use location information to analyze designated areas of interest on the object that must be present in a desired pattern for the object to "pass" inspection.

With brief reference to FIG. 2, a timeline is shown, which illustrates a typical operating cycle for a vision detector in visual event detection mode. A portion 200 of the exemplary timeline corresponds to the inspection of a first object, and contains the capture and analysis of seven frames by the vision detector. A second portion 210 corresponds to the inspection of a second object, and contains five frames.

Boxes labeled "c", such as box 220, represent image capture by the vision detector 100. Boxes labeled "a", such as box 230, represent image analysis. It is desirable that capture "c" of the next image be overlapped with analysis "a" of the current image, so that (for example) analysis step 230 analyzes the image captured in capture step 220. In this timeline, analysis is shown as taking less time than capture, but in general analysis will be shorter or longer than capture depending on the application details. If capture and analysis are overlapped, the rate at which a vision detector can capture and analyze images is determined by the longer of the capture time and the analysis time. This is the "frame rate". The above-incorporated-by-reference METHOD AND APPARATUS allows objects to be detected reliably without a trigger signal, such as that provided by a photodetector.

Each analysis step "a" first considers the evidence that an object is present. Frames where the evidence is sufficient are called active. Analysis steps for active frames are shown with a thick border, for example analysis step 240. In an exemplary implementation, inspection of an object begins when an active frame is found, and ends when some number of consecutive inactive frames are found. In the example of FIG. 2, inspection of the first object begins with the first active frame corresponding to analysis step 240, and ends with two consecutive inactive frames, corresponding to analysis steps 246 and 248. Note that for the first object, a single inactive frame corresponding to analysis step 242 is not sufficient to terminate the inspection.

At the time that inspection of an object is complete, for example at the end of analysis step 248, decisions are made on the status of the object based on the evidence obtained from the active frames. In an exemplary implementation, if an insufficient number of active frames were found then there is considered to be insufficient evidence that an object was actually present, and so operation continues as if no active frames were found. Otherwise an object is judged to have been detected, and evidence from the active frames is judged in order to determine its status, for example pass or fail. A variety of methods may be used to detect objects and determine status within the scope of this example; some are described below and many others will occur to those skilled in the art. Once an object has been detected and a judgment made, a report may be made to appropriate automation equipment, such as a PLC, using signals well-known in the art. In such a case a report step would appear in the timeline. The example of FIG. 5 corresponds instead to a setup such as shown in FIG. 1, where the vision detector is used to control a downstream reject actuator 170 via signal 150. By considering the position of the object in the active frames as it passes through the field of view, the vision detector 100 estimates the mark time 250 and 252 at which the object crosses the mark point 190 (FIG. 1). Note that in cases where an encoder 180 is used, the mark time is actually an encoder count; the reader will understand that time and count can be used interchangeably. A report 260, consisting of a pulse of appropriate duration to the reject actuator 170, is issued after a precise delay 270 in time or encoder count from the mark time 250.

Note in particular that the report 260 may be delayed well beyond the inspection of subsequent objects such as object 110 (FIG. 1). The exemplary vision detector 100 uses well-known first-in first-out (FIFO) buffer methods to hold the reports until the appropriate time.

Once inspection of an object is complete, the vision detector 100 may enter an idle step 280. Such a step is optional, but may be desirable for several reasons. If the maximum object rate is known, there is no need to be looking for an object until just before a new one is due. An idle step will eliminate the chance of false object detection at times when an object couldn't arrive, and will extend the lifetime of the illumination system because the lights can be kept off during the idle step.

The processor of the exemplary above-incorporated-by-reference METHOD AND APPARATUS is provided with two types of software elements to use in making its decisions: "Locators" that locate the object and "Detectors" that decide whether an object feature is present or absent. The decisions made by both Locators and Detectors are used to judge whether an object is detected and, if so, whether it passes inspection. In one example, Locators can be simply described as a one-dimensional edge detector in a region of interest. The vision detector is configured for locating objects by placing Locators at certain positions in an image where an edge feature of the object can be seen when the object is in the field of view. The Locator can be oriented with respect to the direction the object is moving, and sized to ensure that the edge feature of the object can be located at multiple positions while in the field of view. During analysis, the location of the edge feature of the object within the Locator can be reported, as well as a logical output state that the location is known.

Detectors are vision tools that operate on a region of interest that produce a logical output state that detects the presence or absence of features in an image of the object. The vision detector is configured for detecting features of an object by placing Detectors at certain positions in an image where object features can be seen when the object is located by the Locators. Various types of Detectors can be used, such as Brightness Detectors, Edge Detectors, and Contrast Detectors.

Detectors can be linked to the location of the feature determined by a Locator to further refine the presence detection and inspection of the object. Accordingly, in each frame where the object may be viewed at a different perspective, the location of the object determined by the Locator will be different, and the position of the Detectors in the image can be moved according to the location determined by the Locator. The operation of the vision detector at high frame rates, therefore permits the vision detector to capture and analyze multiple images of the object while it passes through the field of view.

The above-discussion of Locators and Detectors is further illustrated by way of example in FIGS. 3 and 4. FIG. 3, thus, represents an image of the object 110 from FIG. 1, containing label feature 120 and hole feature 124, with superimposed graphics (termed "Photos" in the above-incorporated METHOD AND APPARATUS) representing a region of the frame whose output can be used to base decisions and is displayed (at appropriate time, such as during vision detector setup—see below) as an "image view" on a Human-Machine Interface (HMI) for a user to view and manipulate. See FIG. 1, for example, showing a detachable or remote HMI 194 with Graphical User Interface (GUI) screen 196 and image view window 198 which displays an associated image view (300) of an object (120, for example) within the vision detector's (100) field of view. Accordingly, FIG. 3 represents an image view, showing the object 300 containing an image of a label 310 and a hole 312. The object in this example contains six visible features to be inspected, corresponding to the two exemplary Locators and four Detectors further described below.

The Locator 320 is used to detect and locate the top edge of the object, and the Locator 322 is used to detect and locate the right edge. A Brightness Detector 330 is used to help detect the presence of the object. In this example the background is brighter than the object, and the sensitivity threshold is set to distinguish the two brightness levels, with the logic output inverted to detect the darker object and not the brighter background. Together the Locators 320 and 322, and the Brightness Detector 330, provide the evidence needed to judge that an object has been detected, as further described below. A Contrast Detector 340 is used to detect the presence of the hole 312. When the hole 312 is absent the contrast would be very low, and when present the contrast would be much higher. A Spot Detector could also be used. An Edge Detector 360 is used to detect the presence and position of the label 310. If the label 310 is absent, mis-positioned horizontally, or significantly rotated, the analog output of the Edge Detector would be very low. A Brightness Detector 350 is used to verify that the correct label has been applied. In this example, the correct label is white and incorrect labels are darker colors.

As the object (110 in FIG. 1) moves from left to right through the field of view of the vision detector 100, the Locator 322 tracks the right edge of the object and repositions Brightness Detector 330, Contrast Detector 340, Brightness Detector 350, and Edge Detector 360 to be at the correct position relative to the object. Locator 320 corrects for any variation in the vertical position of the object in the field of view, repositioning the Detectors based on the location of the top edge of the object. In general Locators can be oriented in any direction. A user can manipulate Photos in an image view by using well-known HMI techniques. A Photo can be selected by clicking with a mouse, and its ROI can be moved, resized, and rotated by dragging. Additional manipulations for Locators are described below.

FIG. 4 shows a logic view containing a wiring diagram corresponding to the example setup of FIG. 3. A wiring diagram shows a series of features (termed "Gadgets" in the above-incorporated-by-reference METHOD AND APPARATUS) 420, 422, 430, 440, 450 and 460 being used to inspect objects and interface to automation equipment, and the connections between logic inputs and outputs of the Gadgets. A wiring diagram may be displayed on an HMI for a user to view and manipulate. A display of Gadgets and their logic interconnections on an HMI is called a logic view. A Locator 420 named "Top", corresponding to Locator 320 in the image view of FIG. 15, is connected to AND Gate 410 by wire 424. Similarly, "Side" Locator 422 corresponding to Locator 322, and "Box" Detector 430, corresponding to Brightness Detector 330, are also wired to AND Gate 410. The logic output of "Box" Detector 430 is inverted, as shown by the small circle 432, and as described above, to detect the darker object against a lighter background. The logic output of AND Gate 410 represents the level of confidence that the top edge of the object has been detected, the right edge of the object has been detected, and the background has not been detected. When confidence is high that all three conditions are true, confidence is high that the object itself has been detected. The logic output of AND Gate 410 is wired to the ObjectDetect Judge 400 to be used as the object detection weight for each frame. Since the logic input to the ObjectDetect Judge in this case depends on the current frame, the vision detector is operating in visual event detection mode. Note, when operating in external trigger mode, an Input Gadget would be wired to ObjectDetect. To operate in continuous analysis mode, nothing would be wired to ObjectDetect.

The choice of Gadgets to wire to ObjectDetect is made by a user based on knowledge of the application. In the example of FIGS. 3 and 4, a user may have determined that detecting just the top and right edges was not sufficient to insure that an object is present. Note that Locator 322 might respond to the label's left edge just as strongly as the object's right edge, and perhaps at this point in the production cycle Locator 320 might occasionally find some other edge in the background. By adding Detector 330, and requiring all three conditions by means of AND Gate 410, object detection is made reliable. In the wiring diagram, Contrast Detector "Hole" 440, corresponding to Contrast Detector 340, Brightness Detector "Label" 450, corresponding to Brightness Detector 350, and Edge Detector "LabelEdge" 460, corresponding to Edge Detector 360, are wired to AND Gate 412. The logic output of AND Gate 412 represents the level of confidence that all three image features have been detected, and is wired to ObjectPass Judge 402 to provide the object pass score for each frame.

The logic output of ObjectDetect Judge 400 is wired to AND Gate 470. The logic output of ObjectPass Judge 402 is inverted (circle 403) and also wired to AND Gate 470. The ObjectDetect Judge is set to "output when done" mode, so a pulse appears on the logic output of ObjectDetect Judge 400 after an object has been detected and inspection is complete. Since the logic output of ObjectPass 402 has been inverted, this pulse will appear on the logic output of AND Gate 470 only if the object has not passed inspection. The logic output of AND Gate 470 is wired to an Output Gadget 480, named "Reject", which controls an output signal from the vision detector than can be connected directly to a reject actuator 170 (FIG. 1). The "Reject" Output Gadget 480 is configured by a user to perform the appropriate delay (270 in FIG. 2) needed by the downstream reject actuator.

To aid the user's understanding of the operation of the exemplary vision detector 100, Gadgets and/or wires can change their visual appearance to indicate fuzzy logic values. For example, Gadgets and/or wires can be displayed red when the logic value is below 0.5, and green otherwise. In FIG. 4, wires 404 and 472 are drawn with dashed lines to indicate a logic value below 0.5, and other wires, for example wire 424, are drawn solid to indicate logic values equal to or greater than 0.5. One skilled in the art will recognize that a wide variety of objects can be detected and inspected by suitable choice, configuration, and wiring of Gadgets. One skilled in the art will also recognize that the Gadget class hierarchy of the above-incorporated-by-reference METHOD AND APPARATUS is only one of many software techniques that could be used to practice the implementation.

FIG. 5 illustrates a method for implementing Brightness and Contrast Detectors as described in the above-incorporated-by-reference METHOD AND APPARATUS. In one exemplary implementation of a Brightness Detector, the analog output is the average gray level within the region of interest (ROI) for analysis by the vision detector. In an exemplary implementation, a kernel of positive weights 500 is created corresponding to the size and shape of the ROI, and the analog output A is the weighted average gray level $$A = \frac{\sum_i w_i z_i}{\sum_i w_i} \tag{1}$$

where $w_i$ is the $i^{th}$ weight and $z_i$ is the corresponding pixel gray level. In this example, the weights approximate a Gaussian function of distance r from the center of the kernel to the center of each weight, $$w(r) = ae^{-\frac{1}{2}\left(\frac{r}{\sigma}\right)^2} \tag{2}$$

so that pixels near the center are weighted somewhat higher than those near the edge. One advantage of a center-weighted Brightness Detector is that if a bright feature happens to lie near the edge of the Detector's ROI, then slight variations in its position will not cause large variations in the analog output. In FIG. 5, a=99, but any suitable value can be used. The value σ is set based on the diameter d of the kernel, $$\sigma = b\frac{(d-1)}{2} \tag{3}$$

In example, b=1.0.

In another exemplary implementation, the analog output is defined by the function C(q), which is the gray level such that:

$$\frac{\sum_{k|z_k \le C(q)} w_k}{\sum_i w_i} = q \tag{4}$$

where q is a percentile chosen by a user. C is the inverse cumulative weighted distribution of gray levels. Various useful values of q are given in the following table:

| q | C(q) |
|---|---|
| 0.0 | absolute minimum gray level in ROI |
| 0.1 | statistically reliable minimum gray level |
| 0.5 | weighted median gray level |
| 0.9 | statistically reliable maximum gray level |
| 1.0 | absolute maximum gray level |

In one example of a Contrast Detector, the analog output is the standard deviation of the gray levels within the ROI. In an exemplary implementation, the array of positive weights 500 is used to compute a weighted standard deviation:

$$A = \frac{\sqrt{\sum_i w_i \sum_i w_i z_i^2 - \left(\sum_i w_i z_i\right)^2}}{\sum_i w_i} \tag{5}$$

In another example, the analog output is given by $$C(q_{hi}) - C(q_{lo}) \tag{6}$$

where the q values may be chosen by the user. Useful values are $q_{hi}=0.95$, $q_{lo}=0.05$.

FIG. 6 illustrates an exemplary method for implementing an Edge Detector to detect step edges. A step kernel 600 is created corresponding to the size and shape of the ROI, and the intended direction of the edge. For step kernel 600, the ROI is a circle 12 pixels in diameter, and the direction of the edge is 15 degrees from horizontal. The step kernel 600 is an approximation of the first derivative of a Gaussian function of distance t from the edge to the center of each weight, $$w(r) = \frac{ar}{\sigma} e^{-\frac{1}{2}\left[\left(\frac{r}{\sigma}\right)^2 - 1\right]} \tag{7}$$

In the implementation of FIG. 6, a=99, but any suitable value can be used. In this example, the equation 7 is used with b=0.5.

The step kernel 600, with values $k_i$, can be considered to be the product of an ideal step edge template $e_i$ and a kernel of positive weights $w_i$:

$$w_i = |k_i| \tag{8}$$

$$e_i = \frac{k_i}{w_i}$$

$$k_i = e_i w_i$$

Note that the ideal step edge template values $e_i$ are +1 when $k_i>0$, corresponding to the black on white region of step kernel 600, and −1 when $k_i<0$, corresponding to the white on black region of step kernel 600.

Define contrast C and weighted normalized correlation $R^2$ of the step kernel and a like-shaped ROI with pixel values $z_i$ as follows:

$$v = \sum_i w_i \sum_i w_i z_i^2 - \left(\sum_i w_i z_i\right)^2 \tag{9}$$

-continued $$C = \frac{\sqrt{v}}{\sum_i w_i}$$

$$R^2 = \frac{\left(\sum_i k_i z_i\right)^2}{v}$$

The contrast C uses the standard formula for weighted standard deviation, and $R^2$ uses the standard formula for weighted normalized correlation, but simplified because for step kernel 600

$$\sum_i w_i e_i = \sum_i k_i = 0 \tag{10}$$

$$\sum_i w_i e_i^2 = \sum_i w_i$$

An orthogonal step kernel 610 with values $k_i'$ is also created that is identical to the step kernel 600 but rotated 90 degrees. The ratio $$D = \left|\frac{\sum_i k_i' z_i}{\sum_i k_i z_i}\right| \tag{11}$$

is a reasonable estimate of the tangent of the angle between the actual and expected direction of an edge, particularly for small angles where D is also a good estimate of the angle itself. Note that an orthogonal step template 610 doesn't need to be created—the values from the step kernel 600 can be used, but corresponding to the pixels values in the ROI in a different order.

FIG. 7 shows how the values R2, C, and D are used to determine the analog output of an implementation of the Edge Detector. One can be confident that an edge has been detected when three conditions are met:

1. The ROI looks like an ideal step edge, which means that the weighted normalized correlation $R^2$ of the ideal step edge template and the ROI is high;
2. The contrast C is significantly above some noise threshold; and
3. The angle D is small.

A weighted normalized correlation operation 700 using ROI 710 and step kernel 720 computes $R^2$. A contrast operation 730 using ROI 710 and step kernel 720 computes C, which is converted by fuzzy threshold operation 740 into a fuzzy logic value 742 indicating the confidence that the contrast is above the noise level. Weighted correlation operations 750 and 752, using ROI 710, step kernel 720, and orthogonal step kernel 722, and absolute value of arctangent of ratio operation 760, compute D, which is converted by fuzzy threshold operation 770 into a fuzzy logic value 772 indicating the confidence that the angle between the expected and actual edge directions is small.

A fuzzy AND element 780 operates on $R^2$ and fuzzy logic values 742 and 772 to produce the analog output 790 of the Edge Detector. Note that $R^2$, being in the range 0-1, can be used directly as a fuzzy logic value. The analog output 790 is in the range 0-1, but it can be multiplied by some constant, for example 100, if a different range is desired. Note that the logic output of an Edge Detector is derived from the analog output using the sensitivity threshold that all Photos have.

FIG. 8 illustrates an exemplary method in accordance with the above-incorporated-by-reference METHOD AND APPARATUS for implementing an Edge Detector to detect ridge edges. A ridge kernel is created corresponding to the size and shape of the ROI, and the intended direction θ of the edge. For ridge kernel, the ROI is a circle 12 pixels in diameter, and the direction θ is 15 degrees from horizontal. The ridge kernel 800 is an approximation of the second derivative of a Gaussian function of distance r from the edge to the center of each weight, $$w(r) = a\left[1 - \left(\frac{r}{\sigma}\right)^2\right]e^{-\frac{1}{2}\left(\frac{r}{\sigma}\right)^2} \tag{12}$$

In FIG. 8, a=99, but any suitable value can be used. In the exemplary implementation, equation 7 is used with b=0.33.

The use of ridge kernel 800 is similar to that for step kernel 600. The contrast C is computed using the same formula, but $R^2$ uses a different formula because the sum of the kernel values is not 0:

$$R^2 = \frac{\left(\sum_i w_i \sum_i k_i z_i - \sum_i w_i z_i \sum_i k_i\right)^2}{v\left[\left(\sum_i w_i\right)^2 - \left(\sum_i k_i\right)^2\right]} \tag{13}$$

Note that this formula reduces to the one used for step edges when the sum of the kernel values is 0.

A different method is used to determine the angle D between the actual and expected edge directions. A positive rotated ridge kernel 810 with values $k_i^+$ is created with an edge direction θ+a, and a negative rotated ridge kernel 810 with values $k_i^-$ is created with an edge direction θ−a. A parabola is fit to the three points $$\left(0, \sum_i k_i z_i\right)\left(a, \sum_i k_i^+\right)\left(-a, \sum_i k_i^-\right) \tag{14}$$

The x coordinate of the minimum of the parabola is a good estimate of the angle D between the actual and expected edge directions.

FIG. 9 shows how the ridge kernels are used to determine the analog output of an example of an Edge Detector that can detect either step or ridge edges. For ridge edge detection, weighted normalized correlation 900 uses ROI 910 and ridge kernel 920 to compute $R^2$. Contrast 930 uses ROI 910 and ridge kernel 920 to compute C, which is then converted to a fuzzy logic value by fuzzy threshold 940. Correlation elements 950, 952 and 954 use ROI 910 and ridge kernel 920, positive rotated ridge kernel 924, and negative rotated ridge kernel 922 to provide input to parabolic fit 960 to compute angle D, which is then converted to a fuzzy logic value by fuzzy threshold 970.

$R^2$ and the fuzzy logic values are used by fuzzy AND element 980 to produce a ridge analog output 992 for an Edge Detector that can detect ridge edges. For an Edge Detector that can detect either step or ridge edges, the ridge analog output 992 and analog output 990 from a step edge detector 988 can be used by fuzzy OR element 982 to produce a combined analog output 991.

FIG. 10 shows an exemplary implementation of graphical controls that can be displayed on an HMI for a user to view and manipulate in order to set parameters for an Edge Detector in accordance with the above-incorporated-by-reference METHOD AND APPARATUS. A set of graphical controls displayed on HMI 194 (FIG. 1) for setting Gadget parameters is called a parameter view. Name text box 1000 allows a user to view and enter a Gadget's name. Time label 1002 shows the time taken by the most recent run of a Gadget. Logic output label 1004 shows a Gadget's current logic output value, and may change color, shape, or other characteristic to distinguish between true (≧0.5) and false (<0.5). Invert checkbox 1006 allows a Gadget's logic output to be inverted.

Position control 1020 is used to position a Photo in the field of view. Diameter spinner 1022 is used to change the diameter of a Detector. Direction controls 1024 are used to orient an Edge Detector to the expected edge direction. Position, diameter, and orientation can also be set by manipulation of graphics in an image view, for example the image view of FIG. 3.

Edge type checkboxes 1030 are used to select the types of edges to be detected and the edge polarity. Dark-to-light step, light-to-dark step, dark ridge, and light ridge can be selected. Any combination of choices is allowed, except for choosing none.

Jiggle spinner 1040 allows the user to specify a parameter j such that the Edge Detector will be run at a set of positions ±j pixels around the specified position, and the position with the highest analog output will be used. Sensitivity threshold controls 1050 allow the user to set the sensitivity fuzzy threshold of a Photo. Zero-point label 1051 shows value $t_0$ that can be set by zero-point slider 1052. One-point label 1053 shows value $t_1$, which can be set by one-point slider 1054. Analog output label 1055 shows the current analog output of a Photo. The analog output is also shown graphically by the filled-in region to the left of analog output label 1055, which shrinks and grows like a mercury thermometer lying on its side. The filled-in region can be displayed in three distinct colors or patterns corresponding to a first zone 1056 below $t_0$, a second zone 1057 between $t_0$ and $t_1$, and a third zone 1058 above $t_1$.

Contrast threshold controls 1060 allow the user to view the contrast C and set the contrast fuzzy thresholds 740 and 940. These controls operate in the same manner as the sensitivity threshold controls 1050.

Direction error controls 1070 allow the user to view the angle between the actual and expected edge directions D and set the direction fuzzy thresholds 770 and 970. These controls operate in the same manner as the sensitivity threshold controls 1050, except that the thermometer display fills from right-to left instead of left-to-right because lower values of D correspond to higher fuzzy logic values.

FIG. 11 illustrates an exemplary method for implementing a Spot Detector in accordance with the above-incorporated-by-reference METHOD AND APPARATUS. A spot kernel 1100 is created corresponding to the size and shape of the ROI. For spot kernel 1100, the ROI is a circle 15 pixels in diameter. The spot kernel 1100 is an approximation of the second derivative of a Gaussian function of distance r from the center of the kernel to the center of each weight, using equations 12 and 7. In an exemplary implementation, b=0.6.

The use of spot kernel 1100 is similar to that for ridge kernel 800. Weighted normalized correlation $R^2$ and contrast C are computed using the same formulas as was used for the ridge kernel.

FIG. 12 shows how the spot kernel is used to determine the analog output of an example of a Spot Detector. Operation of the Spot Detector is identical to the Edge Detector example shown in FIG. 7, except that angle D is not computed or used.

A weighted normalized correlation 1200 uses ROI 1210 and spot kernel 1220 to compute $R^2$. Contrast 1230 uses ROI 1210 and spot kernel 1220 to compute C, which is then converted to a fuzzy logic value by fuzzy threshold 1240. $R^2$ and the fuzzy logic value are used by fuzzy AND element 1280 to produce a spot analog output 1290.

FIG. 13 shows a pair of image views that will be used to describe the operation of Locators according to an exemplary implementation in accordance with the above-incorporated-by-reference METHOD AND APPARATUS. In a first image view 1300 and a second image view 1302 there is one Detector 1310 and one Locator 1312. The reader will understand that the following description of Detector 1310 and Locator 1312 applies generally to any Detector and Locator. The reader will further understand that many alternate methods can be devised for configuring Locators within the scope of this example.

In one example, a Locator searches a one-dimensional range for an edge, using any of a variety of well-known techniques. The search direction is normal to the edge, and a Locator has a width parameter that is used to specify smoothing along the edge, which is used in well-known ways. The analog output of a Locator depends on the particular method used to search for the edge.

In one example, a Locator searches a one-dimensional range for an edge using the well-known method of computing a projection of the ROI parallel to the edge, producing a one-dimensional profile along the search range. The one-dimensional profile is convolved with a one-dimensional edge kernel, and the location of the peak response corresponds to the location of the edge. A interpolation, such as the well-known parabolic interpolation, can be used if desired to improve the edge location accuracy. In another example, an edge can be located by searching for a peak analog output using the edge detector of FIG. 7 or FIG. 9, once again interpolating to improve accuracy if desired.

In another example, a Locator searches a multi-dimensional range, using well-known methods, which may include translation, rotation, and size degrees of freedom. It will be clear to one skilled in the art how to employ multi-dimensional Locators to position Photos in practicing the example, so the following discussion will be limited to one-dimensional Locators, which are preferred due to their simplicity.

Detector 1310 and Locator 1312 can be moved around in the FOV by clicking anywhere on their border and dragging. Detector 1310 has a resize handle 1320 for changing its diameter, and Locator 1312 has a resize handle 1322 for changing its width and range, and a rotate handle 1324 for changing its direction. All Photos can be moved by dragging the border, and have similar handles as appropriate to their operation.

In the example of FIG. 13, a Locator is drawn in an image view as a rectangle with a inside line segment called the plunger 1330. The width of the Locator is along the plunger, and its range is normal to the plunger. A Locator is oriented by a user so that the plunger is approximately parallel to the edge to be found. The rectangle shows the search range, and the plunger shows the location of a detected edge, if any. If no edge is detected, the plunger is drawn in the center of the range.

A Locator has a rail 1332, shown in FIG. 13 as a dashed line, which is coincident with the plunger but extending in both directions to the edge of the image view.

Every Photo can be linked to zero or more locators, up to some maximum number determined by this example. The number of links determines the number of degrees of freedom that the Locators can control. Degrees of freedom include rotation, size, and the two degrees of freedom of translation. In one example, the maximum number of links is two and only the translation degrees of freedom are controlled.

A linkage defines how a Photo moves as the Locator's plunger moves, following an edge in the image. The movements are defined to keep the Photo at a constant relative distance to the rail or rails of the locators to which it is linked. In this example, the linkages are drawn using a mechanical analogy, such that one could actually build a linkage out of structural elements and bearings and the Photos would move in the same way as forces are applied to the plungers.

In FIG. 13 the linkage from Detector 1310 to Locator 1312 includes a rod 1340, which is rigidly attached to Detector 1310 by a post 1342, and to a slider 1344 that is free to move along the rail 1332, but which holds the rod at right angles to the rail. The post is drawn on the border of a Photo such that the rod, if extended, would pass through the center of the Photo and at the closest of the two possible such points to the rail. A Locator's rail is only shown if there are linkages to it.

Every photo has an emitter, a diamond-shaped handle drawn somewhere on the border. For example Detector 1310 has emitter 1350 and Locator 1312 has emitter 1352. A link is created by drag-dropping a Photo's emitter to any point on a Locator. If the link already exists, the drag-drop might delete the link, or another mechanism for deleting might be used. The user may not create more than the maximum number of allowable links from any Photo, nor any circular dependencies. To aid the user during an emitter drag over a Locator, a tool tip can be provided to tell the user whether a link would be created, deleted, or rejected (and why). Dragging a Locator does not change the behavior of its plunger—it stays locked on an edge if it can find one, or reverts to the center if not. Thus dragging a locator while an edge is detected just changes its search range; the plunger does not move relative to the FOV. More generally, dragging a Locator never changes the position of any Photo to which it is linked. Dragging a Locator will adjust the rod lengths as necessary to insure that no other Photo moves relative to the FOV.

Any plunger may be dragged manually within the range of its Locator, whether or not it has found an edge, and any linked Photos will move accordingly. This allows users to see the effect of the linkages. As soon as the mouse button is released, the plunger will snap back to its proper position (moving linked Photos back as appropriate).

In FIG. 13, Detector 1310 is linked to one Locator 1312, and so one translation degree of freedom is controlled. The degree of freedom is normal to the edge direction, which means that it is in the direction of rod 1340. Comparing second image view 1302 with first image view 1300, the plunger 1330 has moved to the right as it follows an edge (not shown) in the image. Note that the position in the FOV of Locator 1312 has not changed, but Detector 1310 has moved to the right to follow the plunger, which is following an edge of an object and therefore following the motion of the object itself. In our mechanical analogy, Detector 1310 moves because it is rigidly attached to rail 1332 by rod 1340, and the rail moves with the plunger.

FIG. 14 shows a pair of image views that will be used to explain the behavior of a Detector linked to two Locators. In a first image view 1440 and a second image view 1402 Detector 1410 is linked to a first Locator 1420 and a second Locator 1430, and so two translation degrees of freedom are controlled. The degrees of freedom are in the direction of first rod 1422 and second rod 1432. Note that the two degrees of freedom are not independent because they are not orthogonal. Handles and emitters are not shown in FIG. 14.

Comparing second image view 1402 with first image view 1400, first plunger 1424 has moved down as it follows a first edge (not shown) in the image, and second plunger 1434 has moved to the left and slightly down as it follows a second edge (not shown). Note that the positions in the FOV of Locators 1420 and have not changed, but Detector 1410 has moved down and to the left to follow the plungers, which is following the edges of an object and therefore following the motion of the object itself. In a mechanical analogy, Detector 1410 moves because it is rigidly attached to first rail 1426 by first rod 1422, and to second rail 1436 by second rod 1432. Note that first slider 1428 has slid to the left along first rail 1426, and second slider 1438 has slid down along second rail 1436. The sliders slide along the rails when two non-orthogonal Locators are linked to a Photo.

If a Photo is linked to two nearly parallel Locators, its motion would be unstable. It is useful to set an angle limit between the Locators, below which the linked Photo will not be moved. This state can be indicated in some way in the image view, such as by displaying the two rods using a special color such as red. The ability to have Locators either at fixed positions or linked to other Locators provides important flexibility. In FIG. 14 neither Locator is linked and so they remain at fixed positions in the FOV, and therefore at fixed positions relative to the illumination, which is often desirable.

FIG. 15 shows a pair of image views 1500 and 1502 that will be used to explain the behavior of a Detector linked to two Locators, where one of the Locators in linked to the other. In a first image view 1500 and a second image view 1502 Detector 1510 is linked to a first Locator 1520 and a second Locator 1530. Second Locator 1530 is also linked to first Locator 1520 via rod 1540, post 1542, and slider 1544. Slider 1544 slides along rail 1522 of first locator 1520. Note that there need be no limit on the number of Photos that can be linked to a Locator; the degree of freedom limit is on the number of links one Photo can have to Locators. In the example of FIG. 15, Detector 1510 is linked to two Locators and is controlled in two translation degrees of freedom. Second Locator 1530 is linked to one Locator and is controlled in one translation degree of freedom. First Locator 1520 is linked to no Locators and remains fixed in the FOV.

The Locators are configured to follow the top and right edges of a circular feature 1550. Comparing second image view 1502 with first image view 1500, the circular feature 1550 has moved down, causing rail 1522 to move down to follow it. This moves both Detector 1510 and second Locator 1530 down. Note that Detector 1510 is at the same position relative to the object, and so is second Locator 1530. This is desirable in this case, because if second Locator 1530 were fixed in the FOV, it might miss the right edge of circular feature 1550 as it moves up and down. Note that this would not be problematic if the edge of an object in the image was a straight line.

First Locator 1520 has no Locator to move it left and right so as to find the top edge of circular feature 1550. The first Locator 1520 cannot link to second Locator 1530 because that would create a circular chain of links, which is not allowed because one Locator has to run first and it cannot be linked to anything. Instead, the motion of the object through the FOV insures that first Locator 1520 will find the top edge. In the example of FIG. 15, the motion is left to right, and due to the high frame rate of a vision detector the object moves only slightly each frame. Eventually, first Locator 1520 will find the top edge, and will do so on a number of frames, depending on the speed of the object, where the top of circular feature 1550 is close to the center of the Locator. On those frames, second Locator 1530 will be positioned properly to find the right edge, and it will move Detector 1510 left and right as needed to keep it in the right position.

FIG. 16 shows an exemplary method, in accordance with the above-incorporated-by-reference METHOD AND APPARATUS, for handling cases where the edge to be found by a Locator does not extend in a straight line, and so placement of the Locator must be fairly precise along the object boundary. This method could be used for first Locator 1520 in FIG. 15 in an application where objects move at very high speed, and so there might be a chance of missing the top edge entirely as the object moves through the FOV. To handle cases like this, Locators have a parameter that can be used to specify the number of parallel sweeps to be made in searching for the edge. The sweeps are spaced apart along the edge by an amount that provides sufficient overlap so that the edge won't fall between the cracks of the sweeps.

Accordingly, FIG. 16 shows a Locator 1600 with four sweeps that has found an edge on the second sweep from the left. Triangular-shaped sweep markers, including example sweep markers 1610 and 1612, are shown outside the dashed-line sweep rectangle 1620 to avoid interference from the locator graphics within. If an edge is not found on any of the sweeps, the Locator reverts to the center of the sweep rectangle (which won't be at a sweep marker for even sweep counts).

FIG. 17 shows how Locators can be used to handle object rotation and size change even in implementations where only two translation degrees of freedom are controlled. The restriction to translation only provides considerable simplicity and transparency for the user, but small object rotation and size changes can still be handled since Photos in different parts of the FOV can translate differently in response to different Locators. Small rotations and size changes are well-approximated by translations within a small region of the FOV, so as long as Photos are linked to at least one nearby Locator, object rotation and size change will look like translation.

Thus, in FIG. 17 a first image view 1700 and a second image view 1702 contain a first Detector 1710, a second Detector 1712, a first Locator 1720, a second Locator 1722, and a third Locator 1724. First Detector 1710 is linked to nearby first Locator 1712 and second Locator 1722, and will be positioned properly even if the object rotates or changes size (as long as the change is not too big). But second Detector 1712 is too far away—a rotation would tend to mis-position second Detector 1712 vertically relative to second Locator 1722, and a size change would tend to mis-position it horizontally relative to first Locator 1720. Third Locator 1724 is used instead of second Locator 1722 to get the vertical position of second Detector 1712, allowing overall object rotation to be handled. The remote first Locator 1720 is used to get horizontal position for second Detector 1712, so the object size should not vary much. If size variation needs to be handled in addition to rotation, one would add a fourth Locator, near second Detector 1712 and oriented horizontally.

Comparing second image view 1702 with first image view 1700, the object (not shown) has moved to the right and rotated counterclockwise, which can be seen by the motion of the Detectors as the Locators follow the object edges. Note that second Locator 1722 and third Locator 1724 are linked to first Locator 1720 so that they stay close to the Detectors.

Having described in detail the setup of Locators and Detectors in accordance with the above-incorporated-by reference METHOD AND APPARATUS, it should be clear that, while effective, the GUI screen of FIG. 10 requires a good degree of user involvement in order to effectively place desired Locators and Detectors. In general, the HMI GUI screen 196 and image view window (198 in FIG. 1), which is used to assist in setup and testing of the vision detector also provides an opportunity many convenient functions of the vision detector 100 to be manipulated by user with relative ease owing to the graphical nature of the GUI. Slide bars to adjust levels, logic wiring diagrams, menus with selector buttons and drag and drop capabilities (among other data-handling and control features) are variously provided by a GUI, and can be combined with real-time images on the screen 196 returned from the vision detector 100.

Thus, in establishing appropriate Locators and Detectors in an image view of an object during setup, the functionality of the GUI can be highly beneficial. It is desirable that the process for setting up such Locators and Detectors be as easy to use and accurate as possible. By arranging functions of the GUI to facilitate automated setup of locators and detectors, the overall performance and ease of use of the vision detector can be greatly enhanced.

SUMMARY OF THE INVENTION

This invention provides a system and method for automating the setup of Locators and Detectors within an image view of an object on the HMI of a vision detector by determining detectable edges and best fitting the Locators and Detectors to a location on the object image view following the establishment of an user selected operating point on the image view, such as by clicking a GUI cursor. In this manner, the initial placement and sizing of the graphical elements for Locator and Detector ROIs are relatively optimized without excessive adjustment by the user. Locators can be selected for direction, including machine or line-movement direction, cross direction or angled direction transverse to cross direction and movement direction. Detectors can be selected based upon particular analysis tools, including brightness tools, contrast tools and trained templates. The Locators and detectors are each associated with a particular set of operating parameters, such as activation threshold, which are displayed in a control box within the GUI (and can be accessed by clicking on the specific Locator or Detector. A parameter bar can also be provided adjacent to the depiction of the Detector on the image view for easy reference. Both Locators and Detectors may be manually readjusted once automatically placed and sized by drag and drop techniques.

In an illustrative embodiment the system includes a GUI screen image view of an object derived from a vision sensor having a field of view in which the object is in relative motion thereto and a plurality of image frames of the object within the filed of view are captured by the vision detector. The image view is accessible by the GUI cursor. An edge detection process determines and analyzes detectable edges in the screen image view and stores edge information. A selector allows a user to select either a (a) Locator or (b) a Detector based upon a predetermined analysis tool for placement on the image view. an automatic placement process then uses that edge information to place the selected (a) Locator or (b) Detector at a position on the image view upon which the cursor points with a size that is determined based upon a location of adjacent edges of the object image view.

The automatic placement process is constructed and arranged to place the Locator on the image view relative to a nearest adjacent edge of the image view and to adjust the Locator so as to avoid a stronger-magnitude more-distant edge. This allows a Locator having a predetermined width when originally sized to be finally sized with a cutoff on the side near the stronger edge, thus avoiding confusion as the object moves through the field of view between edges, since the Locator's activation threshold is generally set relative to the nearest adjacent edge's magnitude.

In addition, the automatic placement process is constructed and arranged to place the Director on the image view relative to the position at which the cursor points so that a relative center of the Detector as at the position at which the cursor points and an outer boundary of the Director extends to a location that is within detected edges of the object image view. The outer boundary is typically circular, and is built from incrementally larger-radius circles until the average score of pixel values of the image within the boundary indicates a change beneath an applicable threshold (based upon brightness or contrast, for example). At this time, the boundary closest to the radius still within the threshold is chosen for the automatically sized ROI of the Detector.

BRIEF DESCRIPTION OF THE DRAWINGS

The invention description below refers to the accompanying drawings, of which:

FIG. 5, already described, is a diagram of a method for analyzing regions of interest to measure brightness and contrast of a visible feature;

DETAILED DESCRIPTION OF AN ILLUSTRATIVE EMBODIMENT

Figure 18:
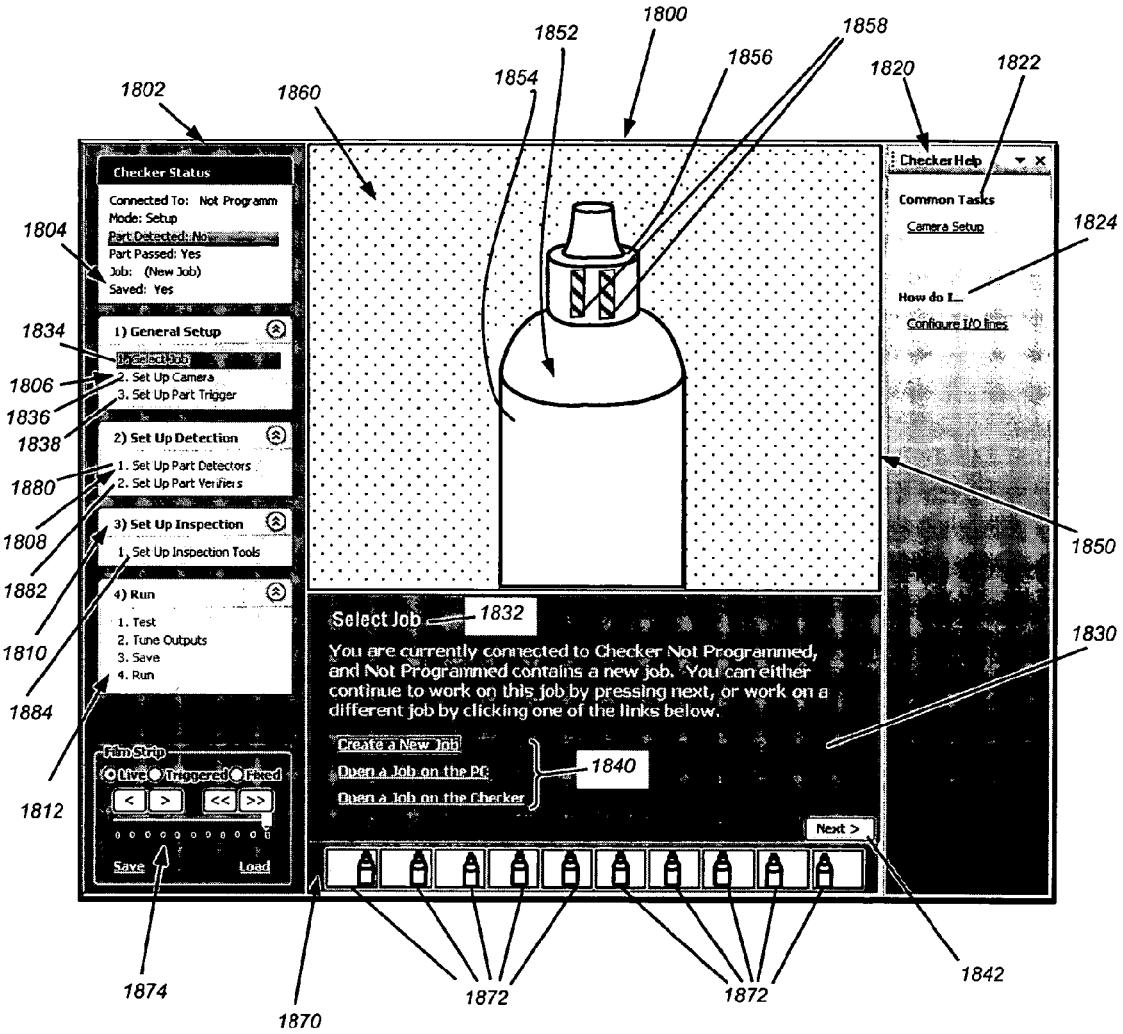
FIG. 18 is a diagram of a Graphical User Interface (GUI) for use with the HMI in accordance with an illustrative embodiment of this invention.

FIG. 18 shows a diagram of a Graphical User Interface (GUI) screen 1800 for a Human-Machine Interface (HMI), interconnected with a vision detector (100) like that shown and described with reference to FIG. 1 above and in connection with the above-incorporated-by-reference METHOD AND APPARATUS FOR VISUAL DETECTION AND INSPECTION OF OBJECTS, by William M. Silver. The screen can reside on any acceptable HMI, including, but not limited to an Laptop Personal Computer (PC); Desktop PC, personal digital assistant or Notebook Computer (for example PC 194) having an appropriate communication link (e.g. USB, wireless, network cable, etc.) with the vision detector (100). An appropriate HMI interface (described in connection with the above-incorporated-by-reference METHOD AND APPARATUS) interconnects with the vision detector's DSP to allow communication with the FMI. Note that the layout and menu contents of the illustrated screen 1800 is exemplary, and a variety of layouts and menu items are contemplated in alternate embodiments. As described above, it is contemplated that the HMI is interconnected to the detector during setup and monitoring or testing. During normal runtime on a production line, the HMI may be disconnected and the detector freely operates various alarms, reject actuators (170) and other interconnected devices, while receiving optical inputs from illuminated objects and electronic inputs from line devices such as the encoder (180).

In this embodiment, the GUI 1800 is provided as part of a programming application running on the HMI and receiving interface information from the vision detector. In the illustrative embodiment, a .NET framework, available From Microsoft Corporation of Redmond, Wash., is employed on the HMI to generate GUI screens. Appropriate formatted data is transferred over the link between the vision detector and HMI to create screen displays and populate screen data boxes, and transmit back selections made by the user on the GUI. Techniques for creating appropriate screens and transferring data between the The screen 1800 includes a status pane 1802 in a column along the left side. This pane controls a current status box 1804, the dialogs for controlling general setup 1806, setup of object detection with Locators and Detectors 1808, object inspection tool setup 1810 and runtime/test controls 1812. The screen 1800 also includes a right-side column having a pane 1820 with help buttons.

The lower center of the screen 1800 contains a current selection control box 1830. The title 1832 of the box 1830 relates to the selections in the status pane 1802. In this example, the user has clicked select job 1834 in the general setup box 1806. Note, the general setup box also allows access to an item (1836) for accessing a control box (not shown) that enables setup of the imager (also termed "camera"), which includes, entry of production line speed to determine shutter time and gain. In addition, the general setup box allows the user to set up a part trigger (item 1838) via another control box (not shown). This may be an external trigger upon which the imager begins active capture and analysis of a moving object, or it may be an "internal" trigger in which the presence of a part is recognized due to analysis of a certain number of captured image frames (as a plurality of complete object image frames are captured within the imager's field of view).

The illustrated select job control box 1830 allows the user to select from a menu 1840 of job choices. In general, a job is either stored on an appropriate memory (PC or vision detector or is created as a new job. Once the user has selected either a stored job or a new job, the next button accesses a further screen with a Next button 1842. These further control boxes can, by default, be the camera setup and trigger setup boxes described above.

Figure 1:
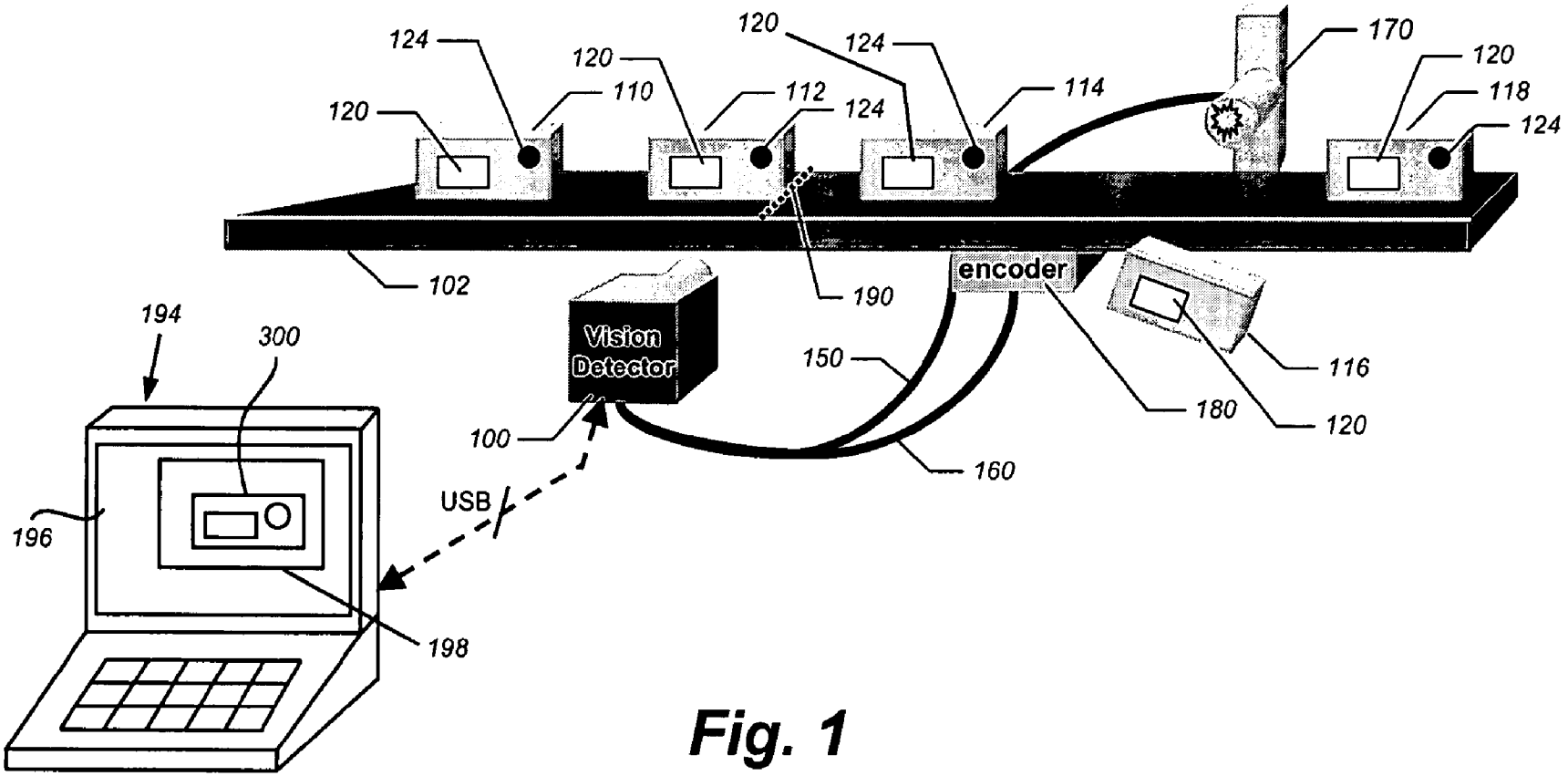
FIG. 1, already described, is a schematic perspective view of an exemplary implementation of a vision detector, inspecting objects on a production line.
Figure 2:
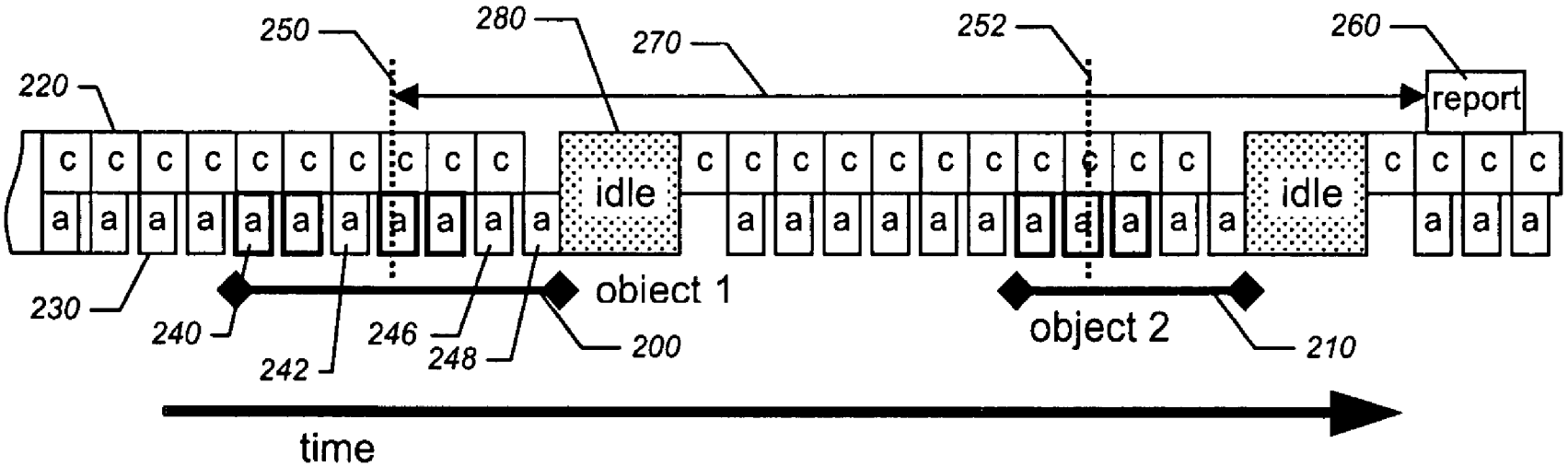
FIG. 2, already described, is a timeline that illustrates a typical operating cycle for the exemplary vision detector of FIG. 1 using visual event detection.

Central to the screen 1800 is the image view display 1850, which is provided above the control box 1830 and between the columns 1802 and 1820 (being similar to image view window 198 in FIG. 1). This display shows a current or stored image frame captured by the vision detector and, essentially, represents the vision detector's current field of view (FOV). In this example, an object 1852 is approximately centered in the display. For the purposes of describing the illustrative embodiment, the exemplary object 1852 is a bottle on a moving line having a main cylindrical body 1854 having a narrowed upper cap section 1856 with a series of graphics 1858 thereon. Any acceptable object or pattern can be substituted herein and the relative motion between the object and the field of view can be generated by moving the objects, moving the vision detector (or moving its FOV) or moving both the objects and the vision detector. In this example, the object 1852 is relative light in surface color/shade. While the background 1860 is relatively dark (as depicted by dot shading). In general, there should exist sufficient contrast or shade differences between at least some portions of the object and the background to attain a basis for detecting and inspecting the object. However, it is contemplated that the object may be mostly dark and the background can be lighter in an alternate example.

As shown in FIG. 18, the object 1852 is either a real-time image being returned from the vision detector under appropriate illumination or it is a stored image. In either case, the image in display 1850 is the one upon which setup of the detector is performed. In this example, the object 1852 is centered in the display 1850 with background space on either side. In other examples, the object may be moved more closely to a side of the display, such as when detection and inspection are based upon internal features located at a distance from an edge.

Before describing further the setup procedure, reference is made briefly to the bottommost window 1870 which includes a line of miniaturized image frames that comprise a so-called "film strip" of the current grouping of stored, captured image frames 1872. These frames 1872 each vary slightly in bottle position with respect to the FOV, as a result of the relative motion. The film strip is controlled by a control box 1874 at the bottom of the left column.

Figure 19:
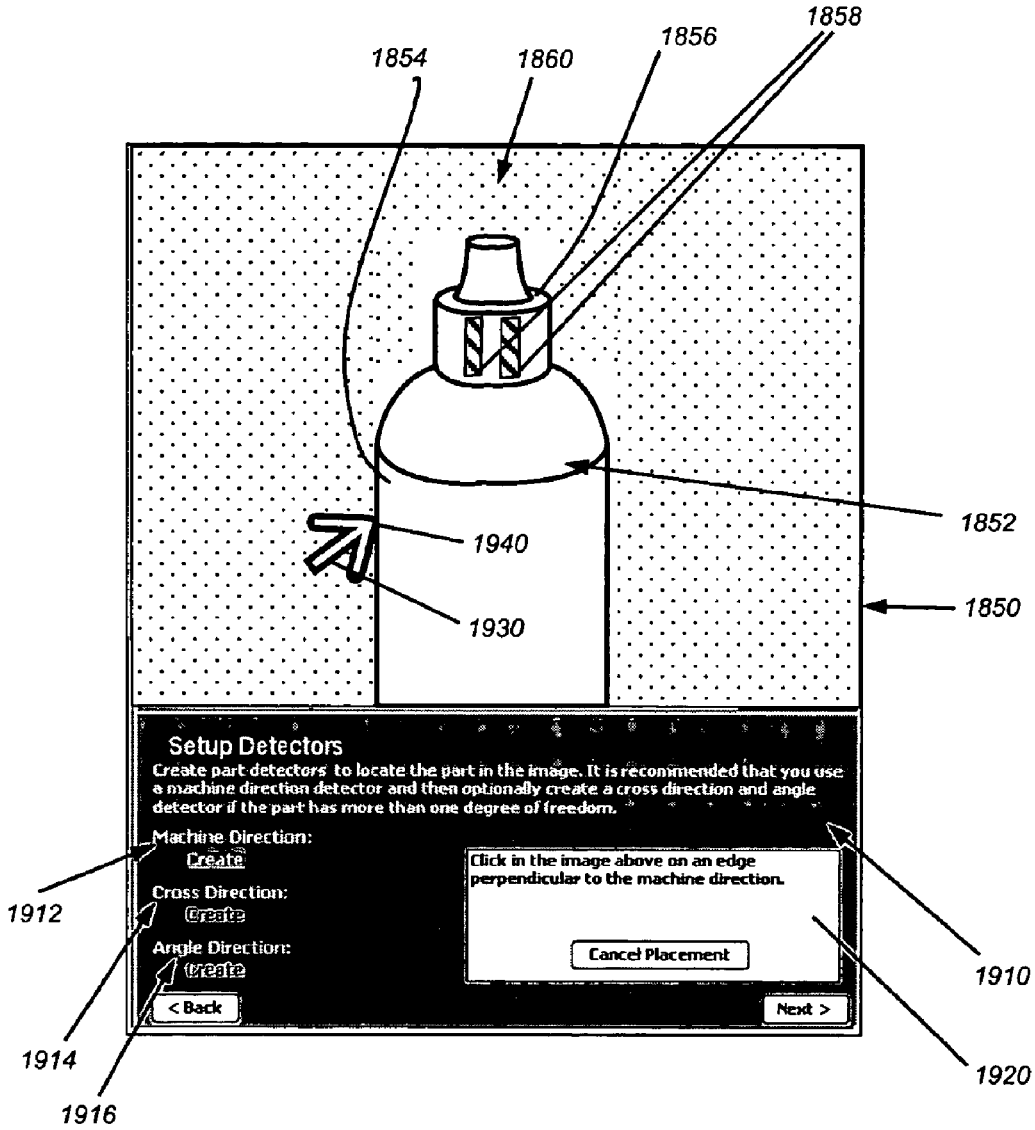
FIG. 19 is a partial view of the diagram of the GUI of FIG. 18 detailing an image view and associated setup box with a cursor preparing to place and edge-detecting Locator.
Figure 20:
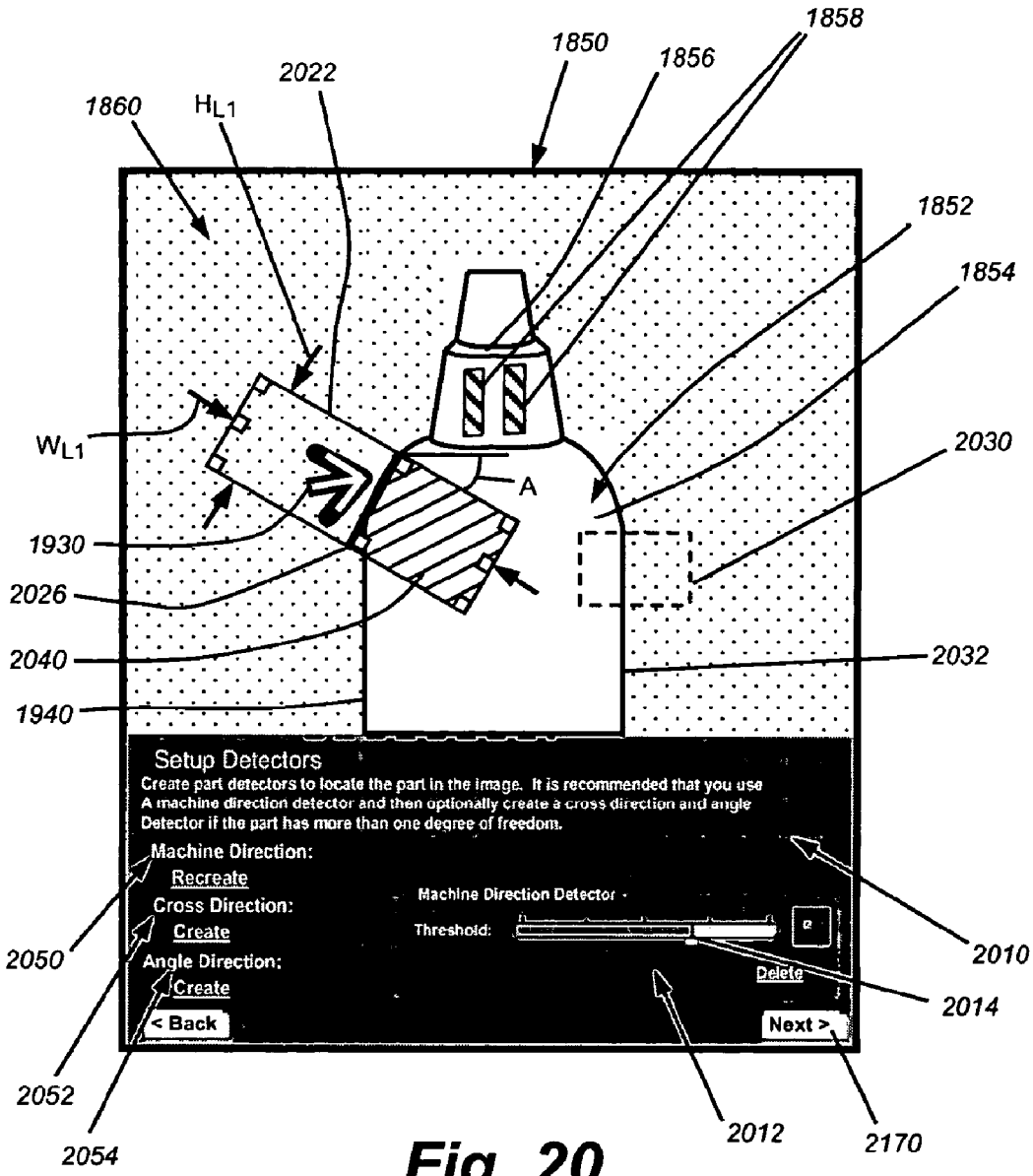
FIG. 20 is a partial view of the diagram of the GUI of FIG. 18 detailing an image view and associated setup box with a cursor having automatically placed an edge-detecting Locator of predetermined size and angle.

Reference is now made to FIG. 19. After performing other general setup functions (see box 1806), the user may setup the mechanism for detecting the object 1852. The user clicks the setup detectors button 1880 in FIG. 18 to access control box 1910. Within this box the user decides which direction he or she wishes to have detection occur. The choices are machine or line-movement direction (typically horizontally or left-to-right/right-to-left across the FOV) 1912, cross direction (typically vertically or transverse to machine direction) 1914 or angle direction 1916. Once a direction is chosen for a main detector (note that additional directions may be chosen by accessing the control box 1910 at a later time), the box 1910 invites the user (dialog 1920) to click on a location in the object image.

As shown, a cursor 1930 is brought toward an edge 1940 of the object 1852. Once the user "clicks" on the cursor placement, the screen presents the control box 2010, which now displays a parameter box 2012. Briefly, this box sets up the applicable threshold indicator 2014 for machine direction. The nature of the parameter box is highly variable herein. In general, the user can decide how high or low to set a threshold for edge detection.

Figure 3:
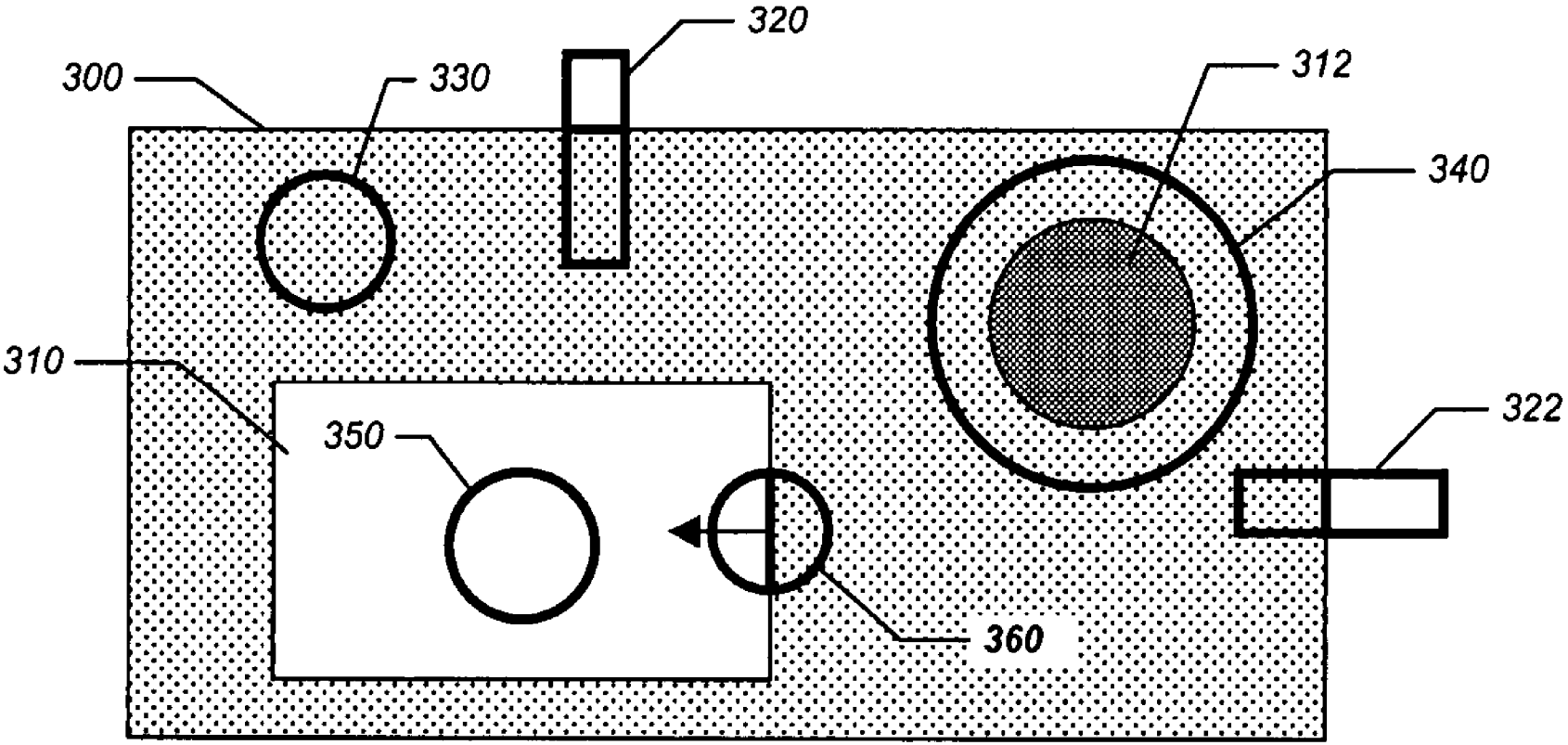
FIG. 3, already described, is an image of an exemplary configuration of the vision detector of FIG. 1 that may be used to inspect an exemplary object.
Figure 4:
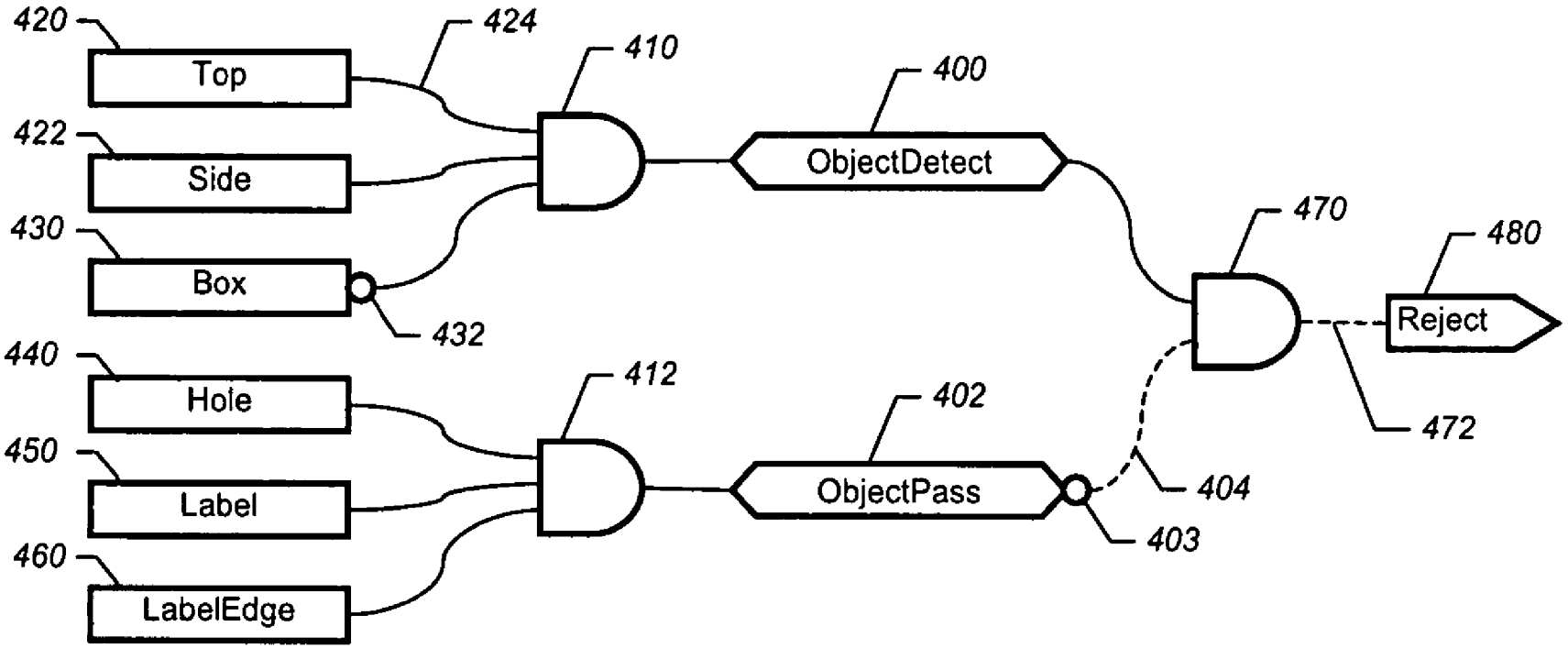
FIG. 4, already described, is a logic diagram of another portion of the configuration corresponding to the exemplary setup of FIG. 3.
Figure 6:
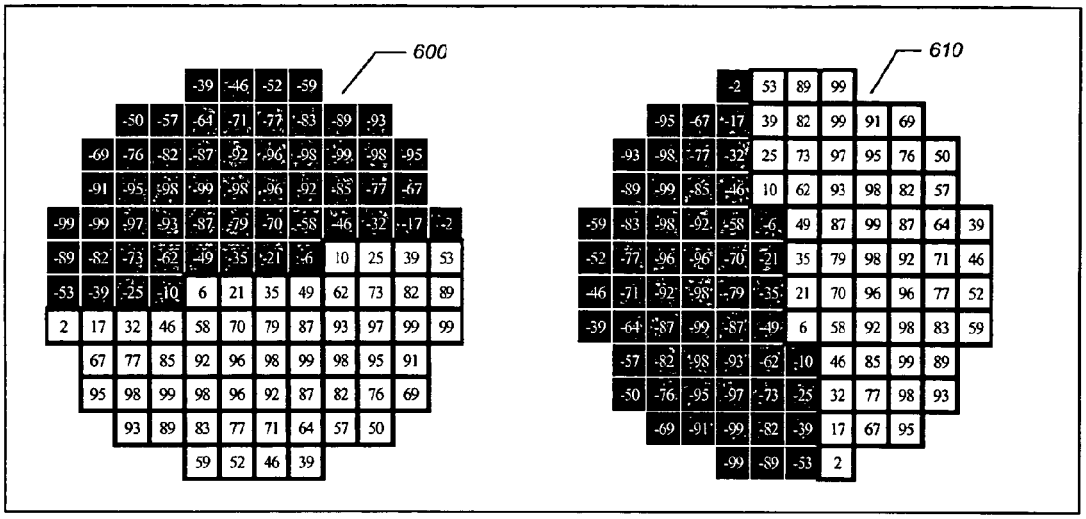
FIG. 6, already described, is a diagram of a method for analyzing regions of interest to detect step edges.
Figure 7:
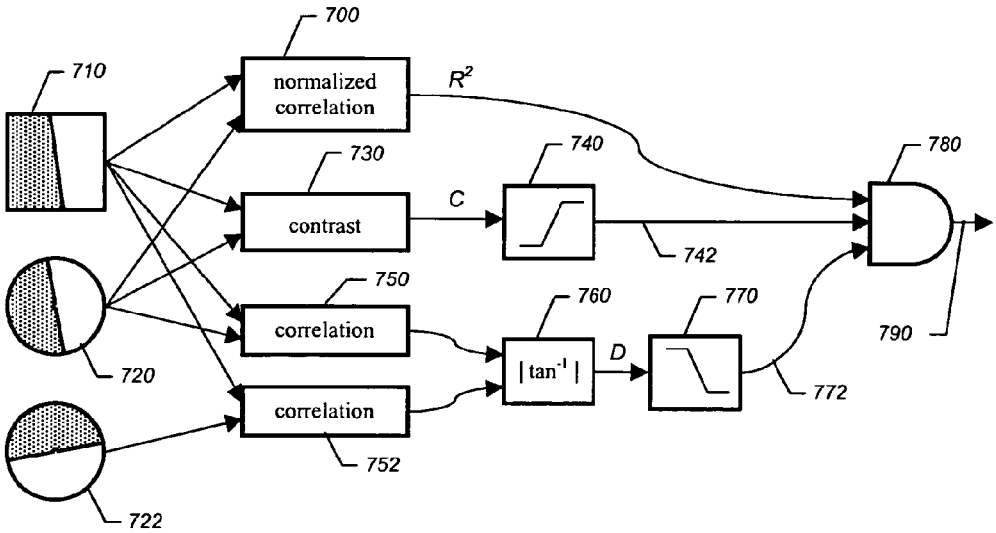
FIG. 7, already described, is a logic diagram of a method for analyzing regions of interest to detect step edges.
Figure 8:
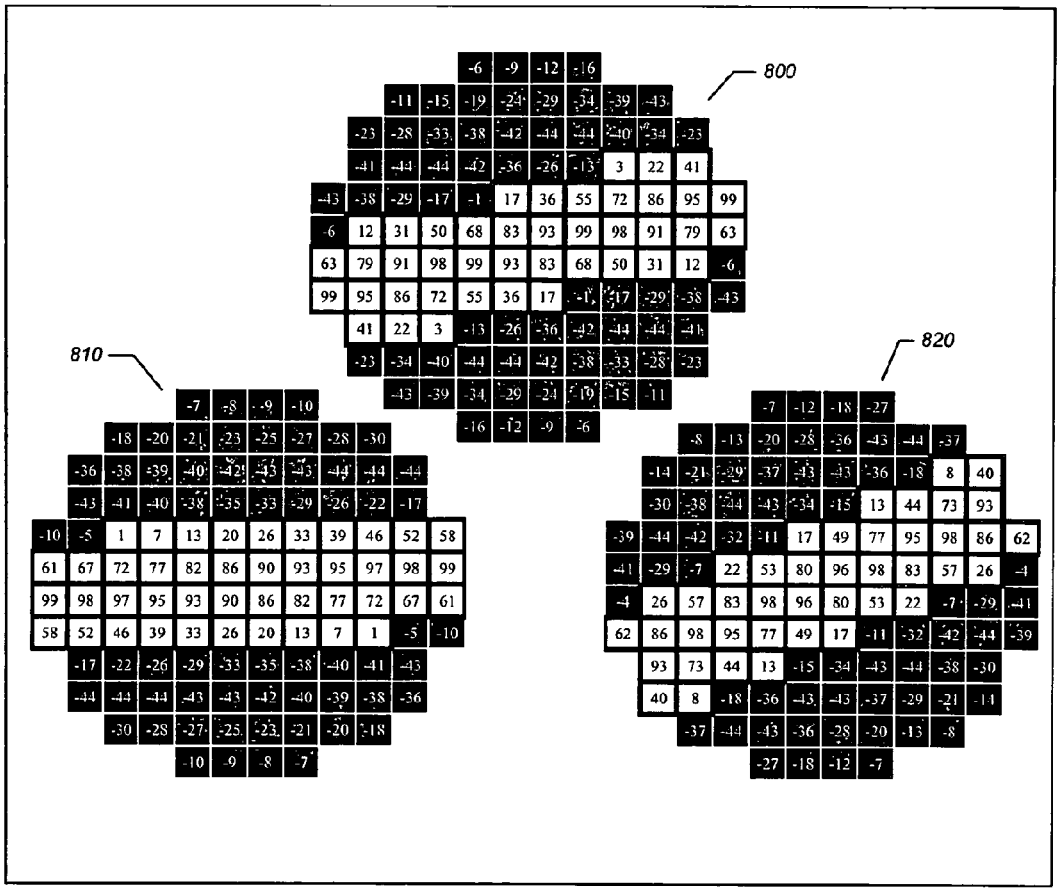
FIG. 8, already described, is a diagram of a method for analyzing regions of interest to detect ridge edges.
Figure 9:
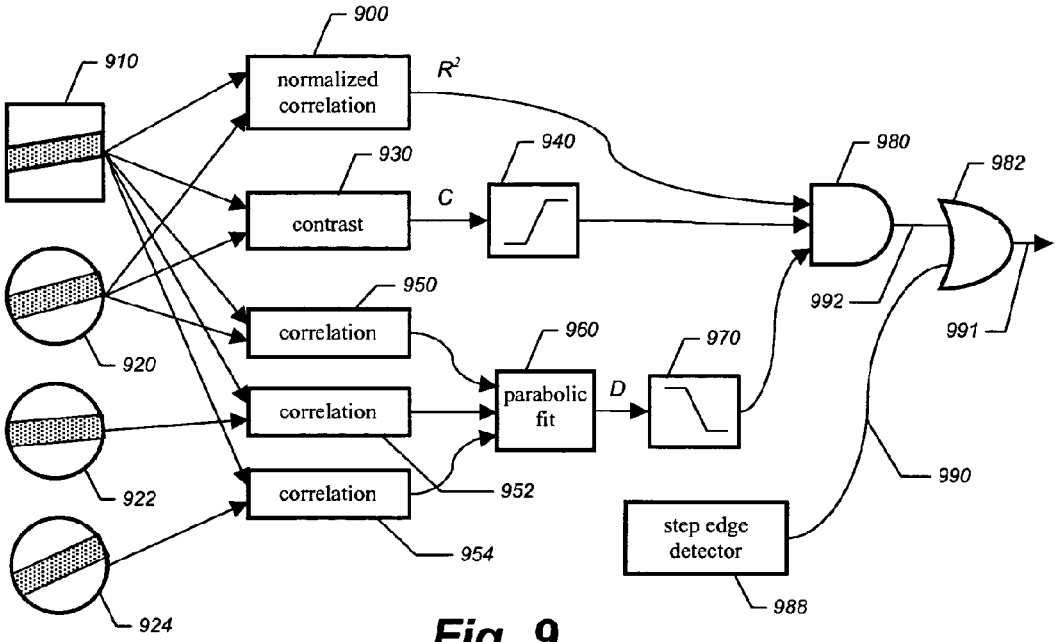
FIG. 9, already described, is a further logic diagram of a method for analyzing regions of interest to detect ridge edges, and illustrates a method for detecting either step or ridge edges.
Figure 10:
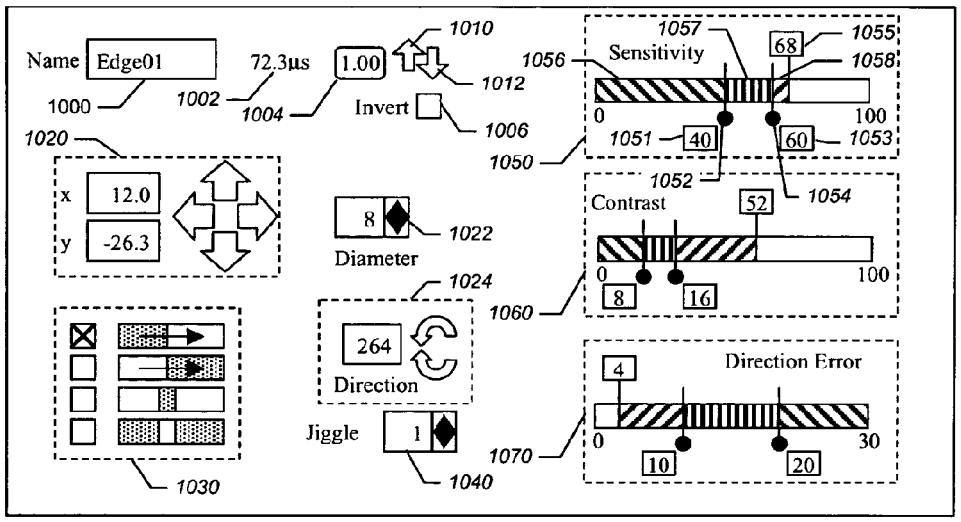
FIG. 10, already described, shows graphical controls that can be displayed on an human-machine interface (HMI) for a user to view and manipulate in order to set parameters for detecting edges.
Figure 11:
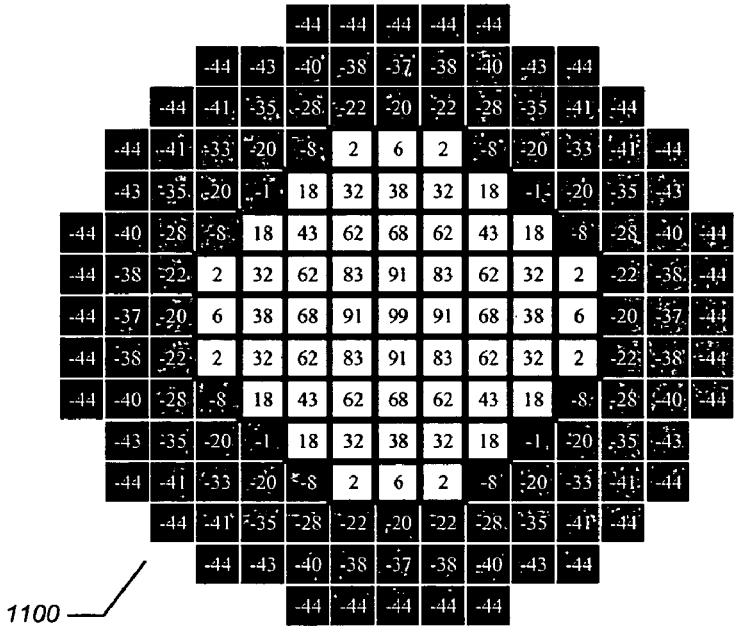
FIG. 11, already described, is a diagram of a method for analyzing regions of interest to detect spots.
Figure 12:
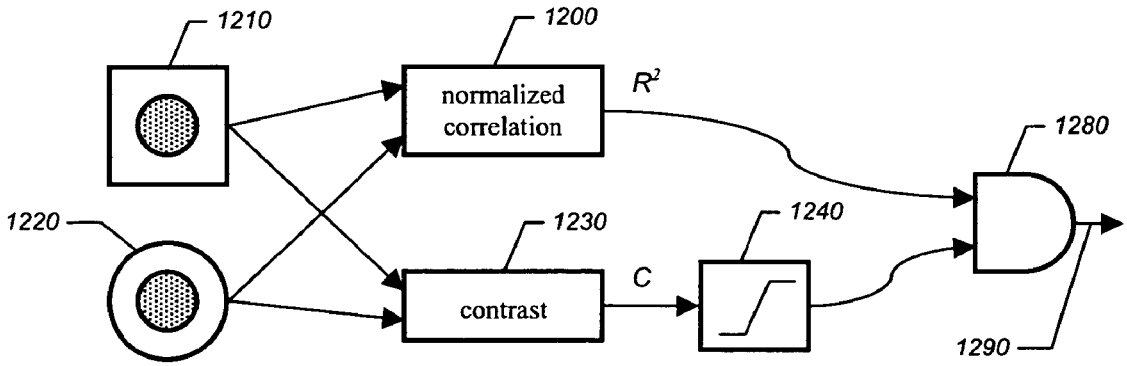
FIG. 12, already described, is a further logic diagram of a method for analyzing regions of interest to detect spots.
Figure 13:
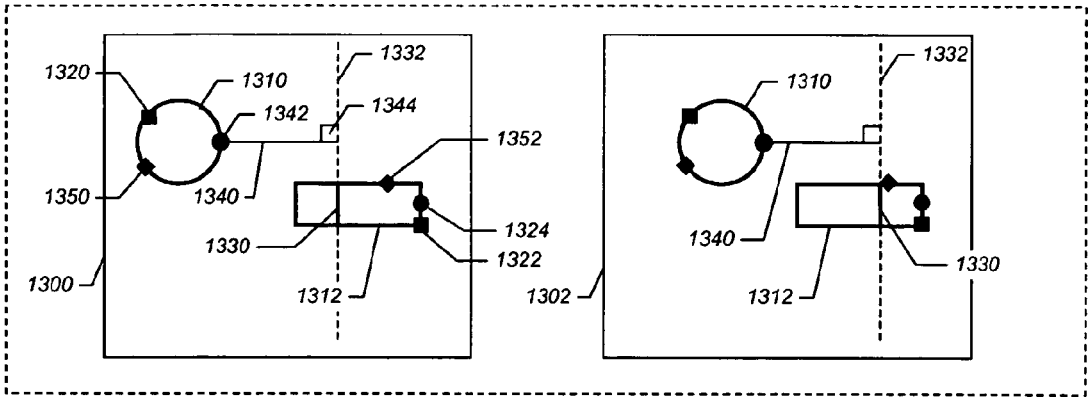
FIG. 13, already described, is a diagram of a method for analyzing regions of interest to track the location of objects in the field of view, and using an HMI to configure the analysis.
Figure 14:
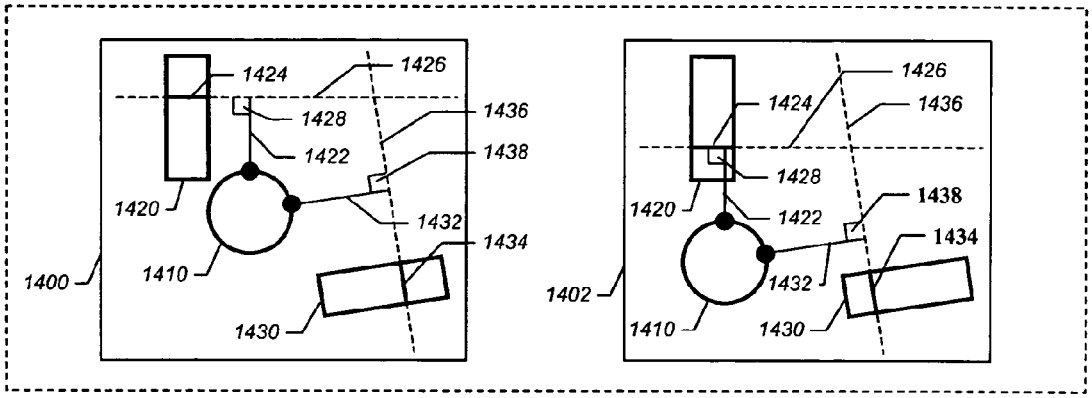
FIG. 14, already described, is a diagram of a method for analyzing regions of interest to track the location of objects in the field of view, and using an HMI to configure the analysis.
Figure 15:
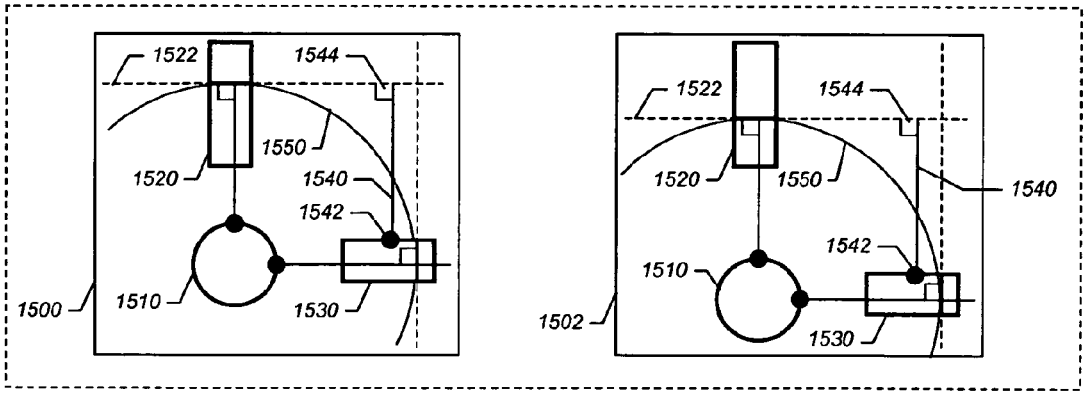
FIG. 15, already described, is a further diagram of a method for analyzing regions of interest to track the location of objects in the field of view, and using an HMI to configure the analysis.
Figure 16:
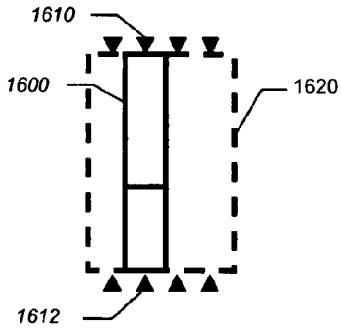
FIG. 16, already described, is a further diagram of a method for analyzing regions of interest to track the location of objects in the field of view, and using an HMI to configure the analysis, in certain cases where placement of the regions of interest must be fairly precise along an object boundary.
Figure 17:
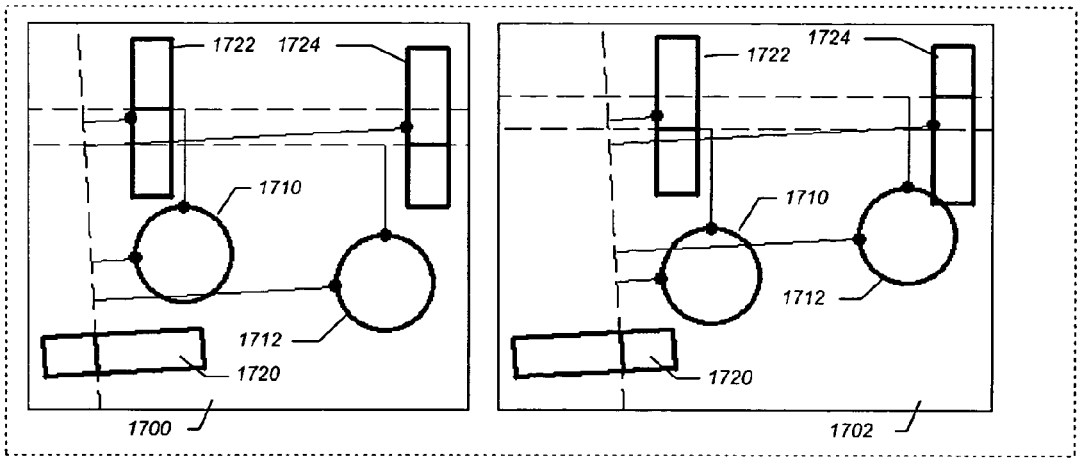
FIG. 17, already described, is a diagram of a method for analyzing regions of interest to track the location of objects in the field of view, and using an HMI to configure the analysis, in cases where objects may rotation and change size.

The click of the cursor 1930 also generates a novel Locator graphic 2020 on the image view 1850 of the object 1852. This graphic 2020 is similar in operation to the Locator 320 (FIG. 3 above) and Locator 1312, and the like described above with reference to FIGS. 13-17. The Locator 1930 of this embodiment uniquely places itself in an orientation that is automatically positioned and sized relative to the closed detectable edge of the object 1852 in the image view 1850. The generalized threshold level is also set by the automated process. In brief summary, the threshold level determines how much transition along an edge or other feature is needed to turn the locator "on."

In this example, the Locator is sized with a height HL1 and width WL1 that are optimized to a given segment of edge 1940 of the object 1852. Likewise, the locator is positioned at an angle A that allows the above-described plunger bar 2022 to approximately define a straight line within the (curving) edge portion closest to the clicked cursor 1930. In general, the height HL1 if the plunger 2020 is chosen by the process so that it remains within a predetermined deviation of the object edge from a straight line. In other words, the plunger, at its opposing ends 2024 and 2026 deviates from the curving object edge 1940 no more than a predetermined distance—a longer plunger would exceed that distance at the selected edge location. The procedure for determining automatic placement and sizing of the Locator 2020 is described in greater detail below.

The position in the FOV at which the cursor 1930 is clicked typically defines the center of the locator. The locator itself remains fixed at the clicked position in the FOV. The moving object image passes through the Locator with the plunger 2022 following the detectable edge transition. In automatic setup, the Locator's width WL1 is determined by the distance from the click point to a detectable edge transition for the object in the setup view. Hence, if the click point of the cursor 1930 were further from the edge 1940, then the Locator graphic would appear longer in the width direction to lie properly upon the object. The extension of the locator into the body of the object image is sufficient so that the edge transition of the object can be of the object can be properly detected while the object is placed in the current image view (the illustrated view upon which setup is being made). Again the height HL1 of the locator and plunger 2022 is based upon a close fit with the nearest object edge transition. A more detailed procedure for the automated placement of a Locator is described with reference to FIGS. 24 and 25 below.

The graphical representation of the Locator 2020 is set to a given polarity so that it properly identifies the transition from light background to dark. A polarity selector (not shown) can be provided in the status pane 1802 or control box 2010. In this manner, a Locator can be placed on either edge (see phantom Locator 2030 on opposing edge 2032) and detect the movement of the object through the FOV from either edge. Polarity can be displayed by providing different, unique, opaque shading on each side of the Locator 2020. In this example, shading fill (symbolized by hatch lines) 2040 is used to show a dark-to-light polarity given a prevailing right-to-left machine direction. Likewise, the opposing alternate Locator 2030 would be set for light-to-dark polarity in this example.

It is contemplated that the automated placement of the Locator 2020 may not always yield the best result. Thus, the control box 2010 includes a recreate button 2050 that allows the Locator 2020 to be removed and replaced in another location by a subsequent move and click of the cursor 1930. Alternatively, the clicking of the cursor 1930 on a different position of the object can be adapted to recreate the Locator elsewhere on the image view 1850. Note that a cross direction button 2052 and angle direction button 2054 can still be accessed to generate additional locators as needed, using the same automated and manual placement and resizing procedures as applicable to the locator 2020.

Figure 21:
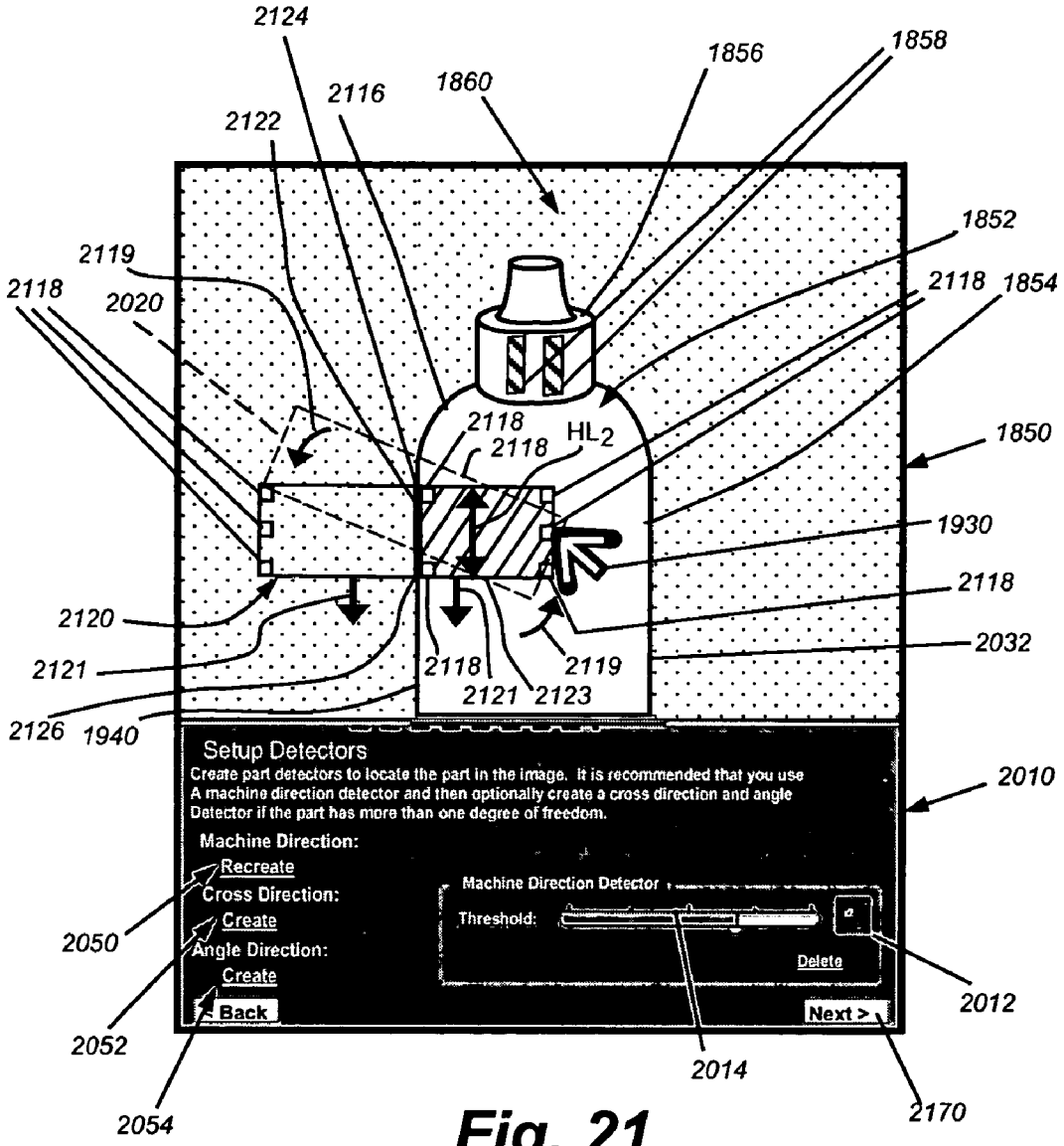
FIG. 21 is a partial view of the diagram of the GUI of FIG. 18 detailing an image view and associated setup box with a cursor optionally realigning and resizing the edge-detecting Locator.

In addition, when a Locator's automatic placement is generally desirable, but its angle, width or height will not necessarily obtain the best results, then the Locator can be manually resized as shown generally in FIG. 21. In this example, the user observes that the Locator is centered too much on the curved portion 2116 of the edge 1940. A better detection can be derived by detecting the edge transition of the lower, straight portion of the bottle body 1854. Thus, using appropriate drag bars 2118, the rectangle can be stretched in the height, width (or both) directions and rotated (curved arrows 2119) about its relative centroid from an original position (shown in phantom) to a desired position (shown solid). In this manner the resized and re-angled Locator 2120 is generated by dragging down (arrows 2121) the lower bar 2123 and rotating to a generally horizontal orientation. The new height HL2 extends more fully down the straight portion (to lower end plunger 2126) of the object edge 1940 and allows the lengthened plunger 2112 to more fully locate the straight portion. The plunger's upper end 2124 deviates more from the upper curved object edge 2116. This may not be of concern where a sufficient distance along the straight portion is covered by the locator. Alternatively, the upper bar 2128 can also be dragged lower to bring the top plunger end 2124 closer to the straight portion. Note that other objects may be more effectively located using non-vertical edges. In such instances, using an angled Locator, where the plunger identifies a strong angled edge may be beneficial.

Figure 22:
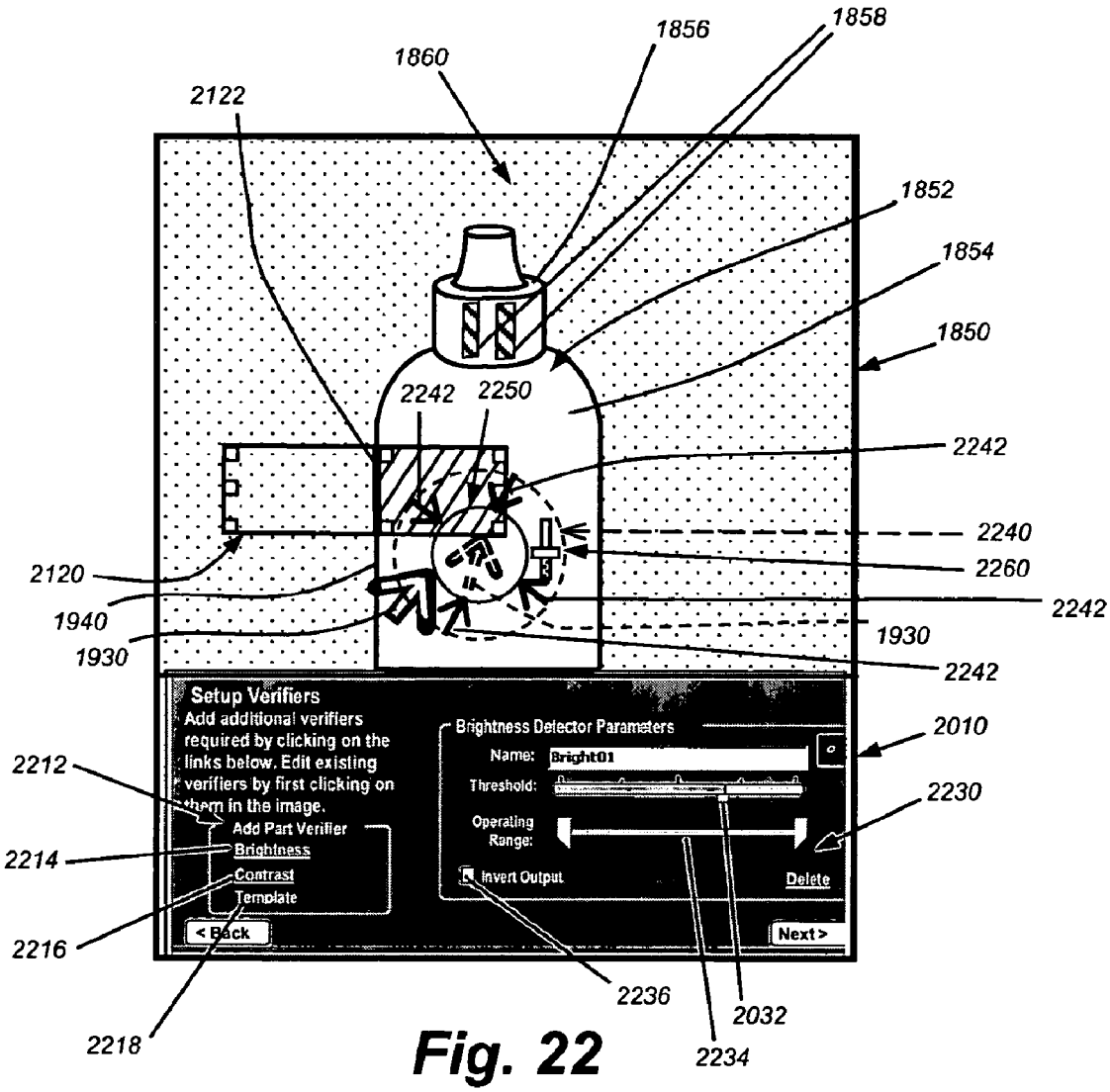
FIG. 22 is a partial view of the diagram of the GUI of FIG. 18 detailing an image view and associated setup box with a cursor placing a first, brightness-based Detector in association with the Locator.

Having placed and adjusted a Locator 2120, reference is now made to FIG. 22 where a Detector (also termed a verifier) is applied. The set up verifiers button 1882 in the status pane 1802 is activated by the user, or the Next button 2170 is pressed, to enter the screen of FIG. 22. This screen includes a new control box 2210 that provides a menu 2212 of image analysis tool types upon which a detector can be based. In this embodiment, three types of analysis are brightness (button 2214), contrast (button 2216) and trained template (button 2218). It is expressly contemplated that differing or additional analysis tools can be provided in alternate embodiments. In this example, the user has selected brightness (2214) as the type, and a parameter box 2230 appears. Briefly, the parameter box 2230 for brightness displays a threshold slide setting and scale 2232 as well as an operating range slide setting 2234. These settings control the level of brightness at which detection occurs (threshold) and the general level of brightness used to distinguish the object versus a background. Note that an invert output checkbox 2236, when clicked, allows the user to detect on a darkness threshold rather than brightness.

When a given type of tool is selected, the user may then move the cursor to an appropriate location on the object 1852 (see cursor 1930 shown in phantom). By clicking on the positioned cursor 1930 (phantom) a Detector region of interest (ROI) circle 2240 (shown in phantom) using brightness as a detection criterion is formed on the object in association with the plunger 2122 of the locator 2120. The diameter of the circle is selected automatically from the center click point based upon placement so that it falls within the desired brightness region of the object. In other words, parts of the ROI that are outside a given brightness range cause the circle to be sized so as to avoid these regions. Similarly to the case of the Locator, the threshold level of a given detector is also estimated and automatically set, subject to subsequent adjustment by the user.

In this example, the automatically sized ROI circle 2240 (phantom) covers a majority of the width of the object body 1854. As described above, when the object is located, its presence is verified by the existence of the bright spot within the ROI. However, the user may desire a longer period of detection. Thus, by clicking the cursor 1930 (shown solid), and dragging on the circle edge, the ROI's diameter can be reduced (arrows 2242) from the larger diameter automatically sized circle (phantom) to a reduced-size circle 2250 that allows verification of presence within a larger range of movement across the FOV. Note that a threshold and brightness bar 2260 is automatically appended to the Detector circle 2250 by the GUI. This allows the user to ascertain the current settings and readings of the particular detector. Such data is helpful particularly where a plurality of detectors are present on the image view, and only one Detector's status is currently shown (typically the last Detector clicked) in the control box 2210. Note that by clicking any Detector or Locator in the image view, the relevant control box and associated parameter box is retrieved and displayed in the GUI.

Figure 23:
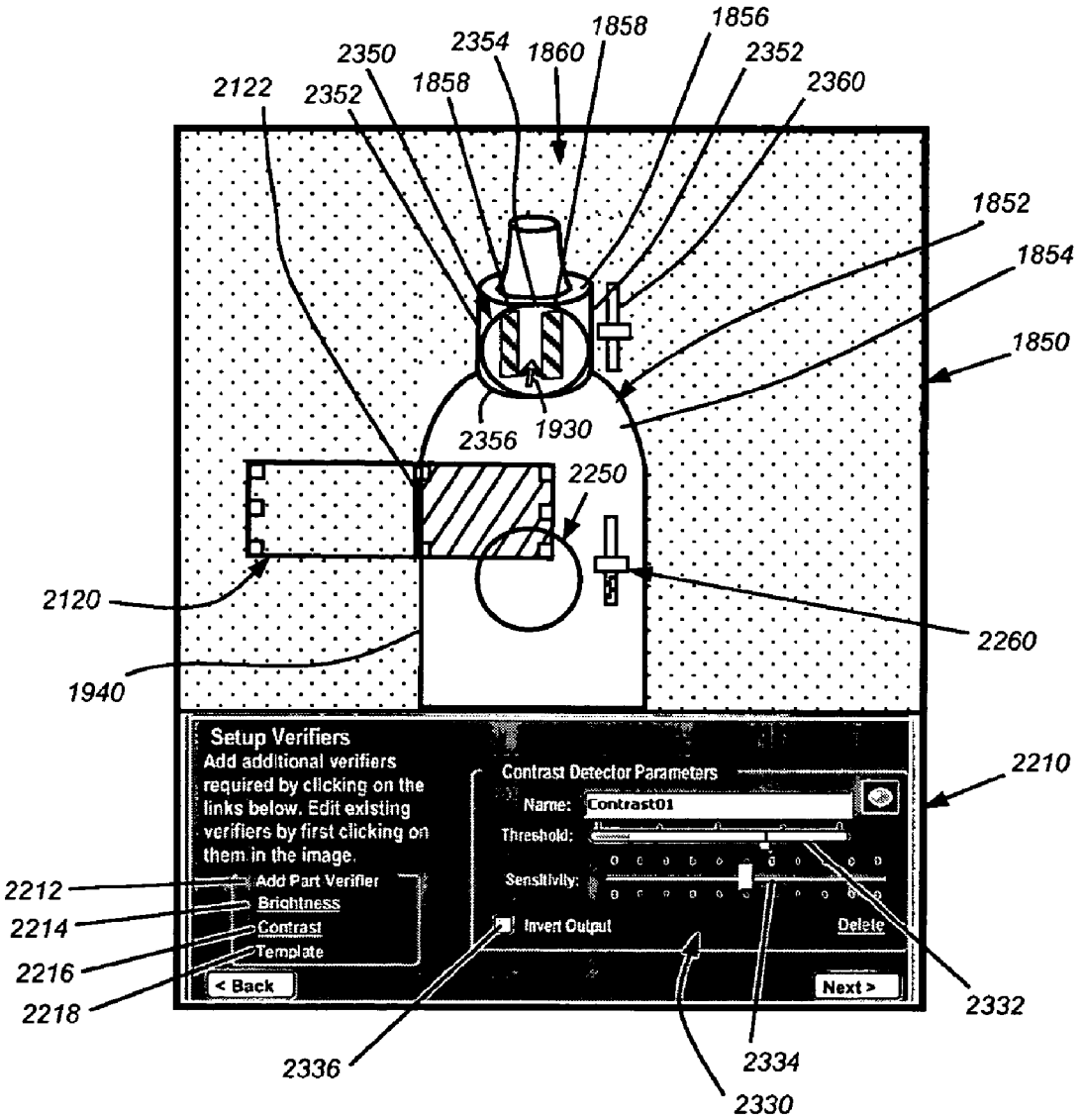
FIG. 23 is a partial view of the diagram of the GUI of FIG. 18 detailing an image view and associated setup box with a cursor placing a second, contrast-based Detector in association with the Locator.

The user may place as many Detectors as he or she desires in association with a given locator. To further verify object presence, a second Detector may be applied as shown in FIG. 23. In this example the user has clicked the contrast button 2216 in the menu 2212 of control box 2210. The control box 2210 now displays a contrast parameter box 2330. This parameter box 2330 includes a threshold setting slider 2332 and sensitivity setting slider 2334. An invert checkbox 2336 is also provided and used as described above. In this example, the user desires to employ the light-and-dark-varying graphics 1858 on the cap 1856 to further verify detection. In this case, the user has decided that, if either a bright spot on the object body 1854 is not found by the Detector 2250, or a contrasting graphic 1850 is not found, then the presence of the object is not detected. Typically, detection implicates regions of an object that would not likely be altered or missing, unlike inspection, described briefly below, in which object regions subject to fault are analyzed.

In the example of FIG. 23, the user has moved the cursor 1930 to the cap and clicked it to create an automatically sized contrast-based Detector ROI circle 2350. This circle 2350 extends approximately the relevant vertical side edges 2352 of the cap 1856 and is otherwise bounded by the respective top and bottom edges 2354 and 2356 of the cylindrical body of the cap. In this instance, the user decides that no resizing is needed. The contrast threshold and sensitivity is shown in the circle's associated bar 2360.

Figure 27:
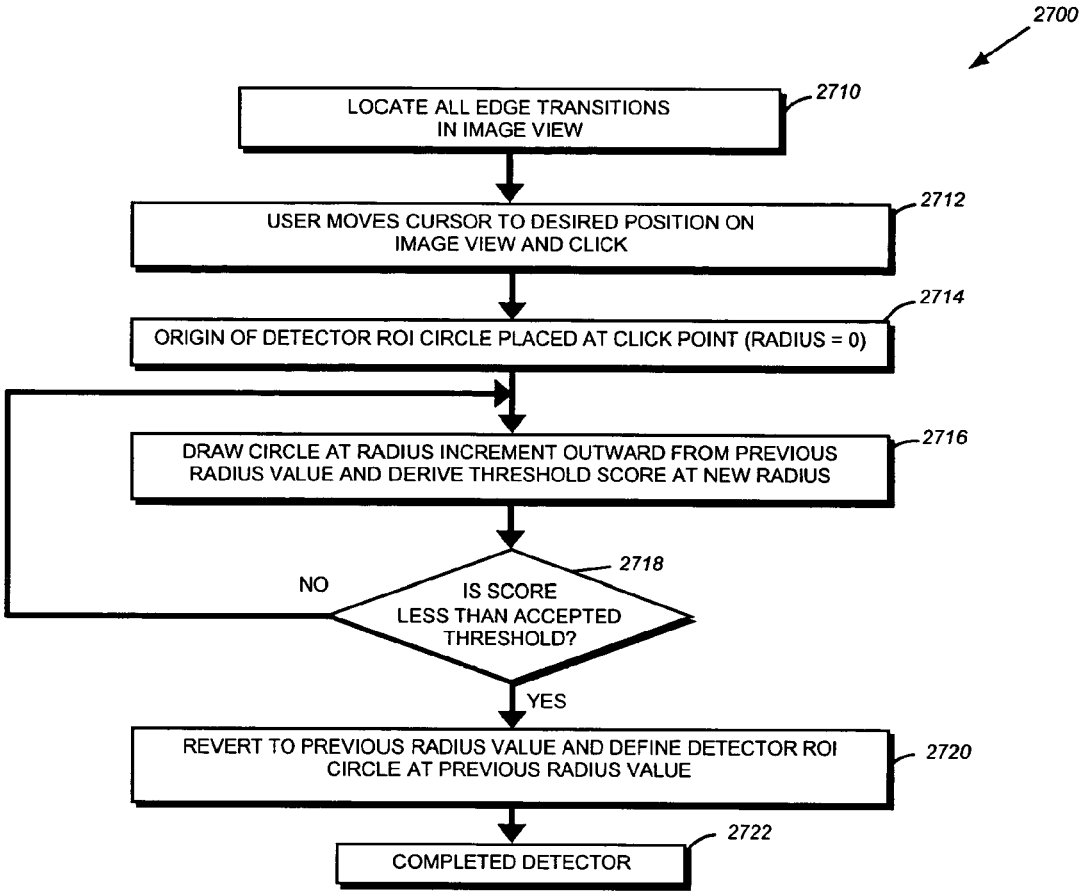
FIG. 27 is a flow diagram of a procedure for the placement and sizing of a Detector ROI circle according to an embodiment of this invention.
Figure 28:
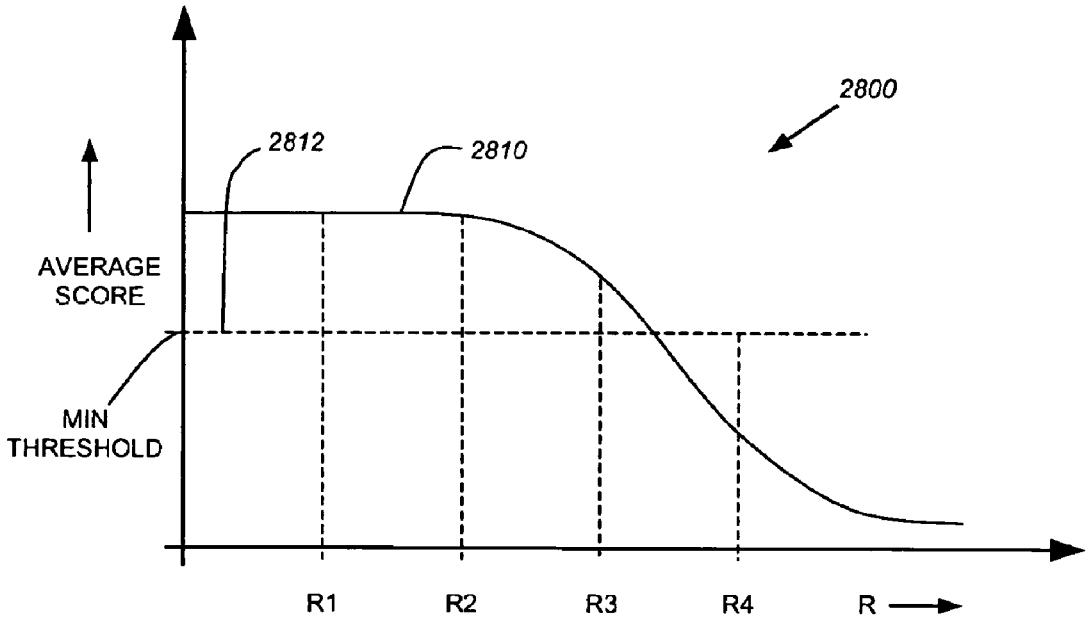
FIG. 28 is a graph of magnitude score versus radius with respect to the procedure of FIG. 27.

Note that the automatic sizing of a Detector ROI circle is described in further detail with reference to FIGS. 26-28 below. In general, the circle is sized so that it does not exceed an area encompassed by relevant details of the object.

Briefly, the user may also select Detectors based upon other tools such as template. When selecting template a control box (not shown) allows the user to lay a dark circle (automatically with manual adjustment option) on an object image location. The user activates a training button to sore the pattern in the vision detector's memory. Generalized pattern-matching algorithms are used to determine whether a detected ROI on the object matches the pattern. A threshold setting slider is provided to adjust the pattern matching algorithm.

The status pane 1810 also shows a set up inspection box 1810 with an associated button 1884 for inspection tools. In general, inspection occurs within the detector concurrently with detection. In some implementations, simply detecting an object is sufficient. In other applications, the detector can inspect objects for flaws by analyzing ROI's in association with a locator. Typically, ROIs are placed in areas where flaws will affect the appearance of the object in sufficient degree to be discriminated by the relatively low-resolution capture of the vision detector. Briefly, when the inspection setup button 1884 is clicked, the user is provided with various screens similar to those in FIGS. 19-23. The user may place an inspection Locator similarly to the automatic procedure above and may then place various inspection Detectors in association with the Locator at desired ROIs. Inspection Detectors may be based upon similar analysis tools (e.g. brightness, contrast and template) may be used, or inspection Detectors may be based upon differing/additional tools. In general, the automatic placement and adjustment of Locators and Detectors occurs identically to the procedure described above for FIGS. 19-23.

Figure 24:
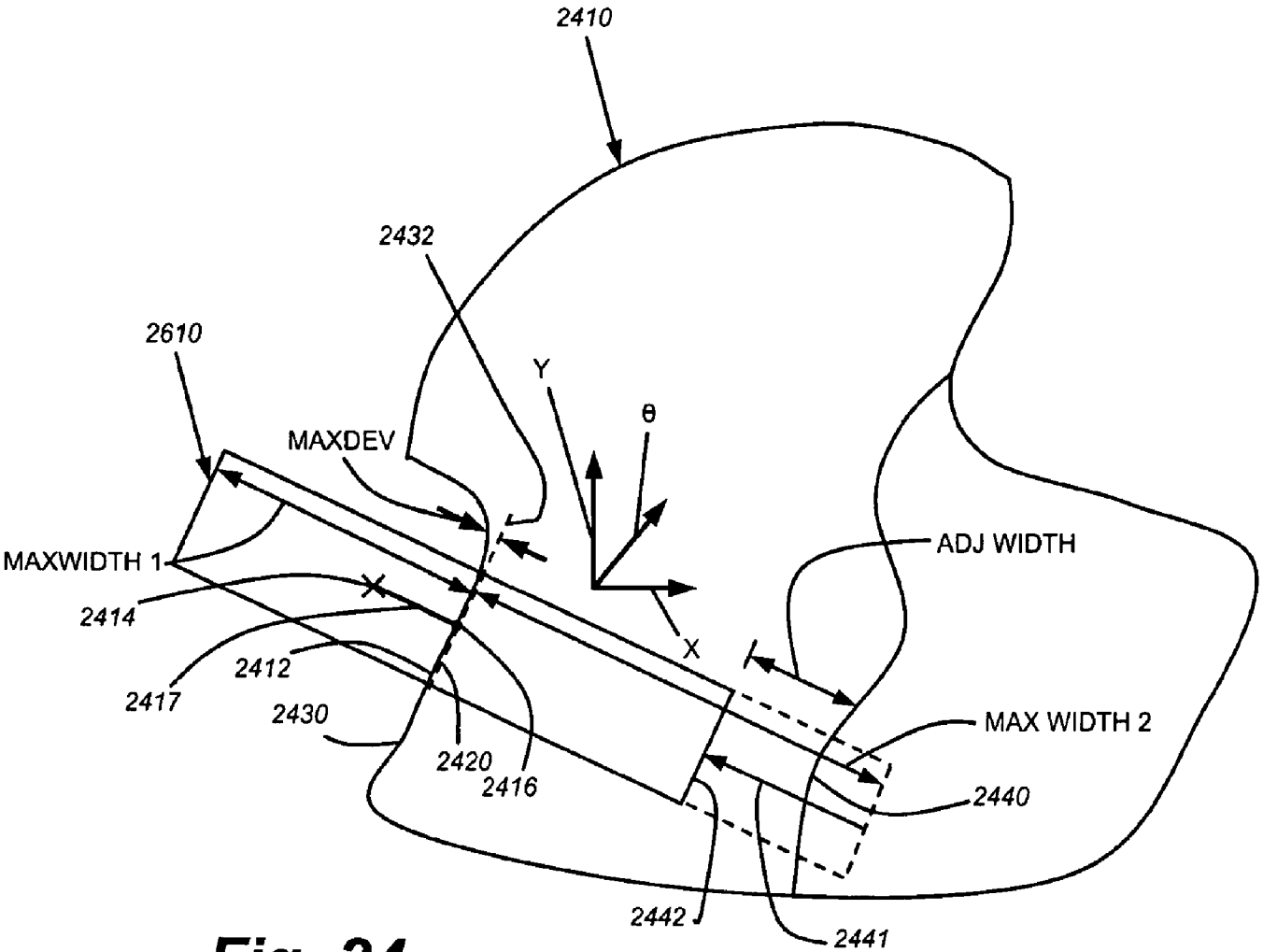
FIG. 24 is a schematic diagram of an exemplary object having multiple edges and the placement and sizing of a Locator in response to the click of the cursor near an edge of an object image view.
Figure 25:
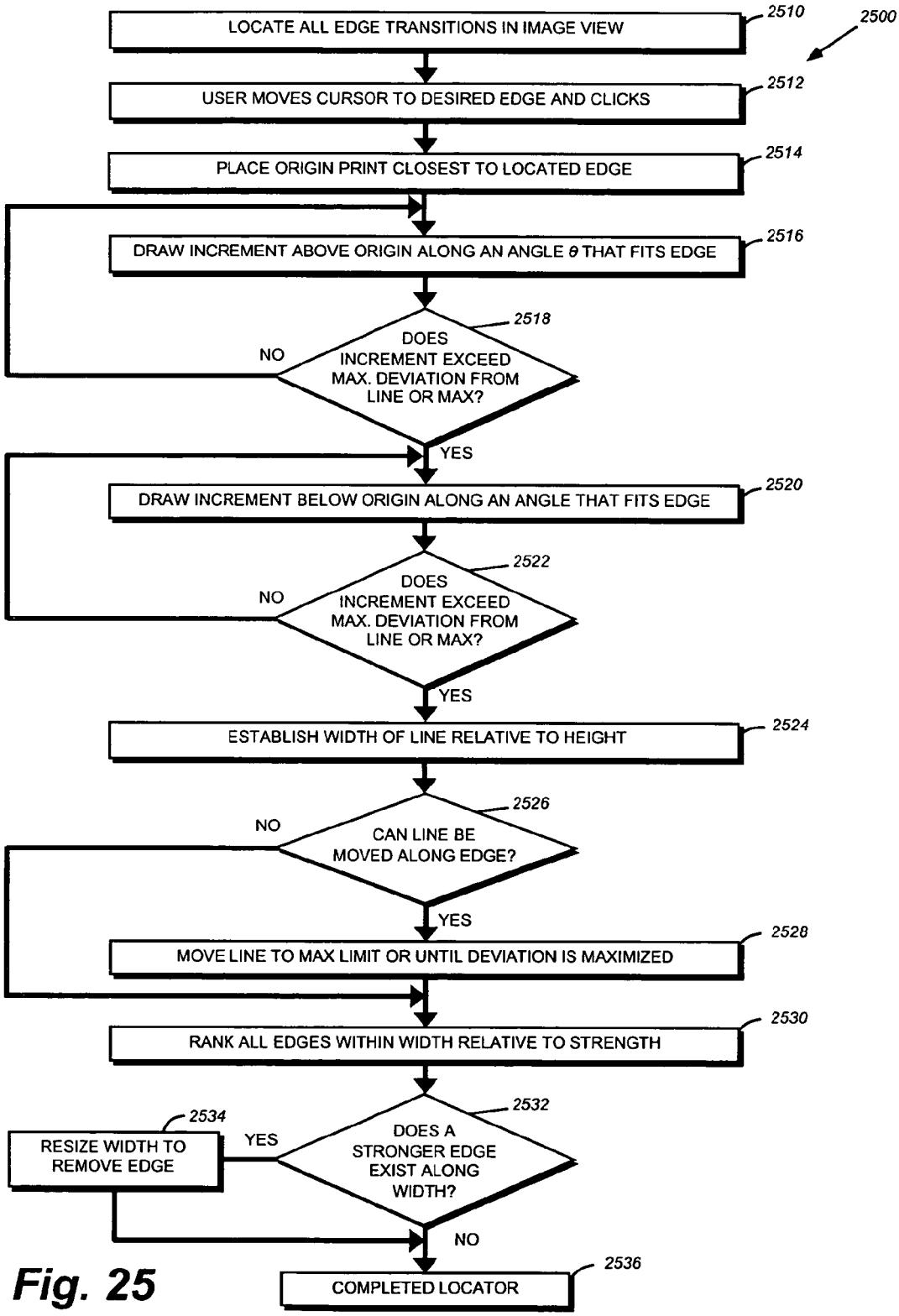
FIG. 25 is a flow diagram of a procedure for the placement and sizing of a Locator according to an embodiment of this invention.

The automatic placement and sizing of a Locator in response to positioning and clicking of a cursor on the image view is now discussed in further detail with reference to FIGS. 24 and 25. FIG. 24 shows an exemplary irregularedged object image view 2410. In FIG. 25, the procedure 2500 begins with a prior edge-location process step 2510 in which all edge transitions within the image view are identified and plotted using a convolution over the entire image employing (in one embodiment) known edge location techniques, such as a Sobel operator that provides every partial edge ("edglet" of the overall edge with a gradient, direction and magnitude.

The user desires to place a Locator along the left-side edge portion 2412 and has clicked a cursor at the click point 2414 at a slight spacing from the edge 2412 (step 2512). The procedure locates the closest point on the nearest located edge 2412 and establishes this point as the Locator origin 2416 (step 2514). The origin 2416 is defined in terms of orthogonal x and y axes and a rotation θ relative to the axes and the closest distance can be determined as the shortest line segment 2419 between the click point 2414 and origin 2416. In one embodiment, the angle of this segment with respect to the X-Y axes defines θ (the segment being oriented at 90 degrees to θ). The procedure 2500 begins to define increments above and below the origin (steps 2516, 2518, 2520 and 2522) generating a line 2420 that fits along the edge 2412 in each direction from the origin 2416. This forms the basis of the plunger when the creation of the Locator is complete. The increments build as far as they are able until the maximum width (according to a predetermined constant) is achieved (for example the lower point 2430). The increments may build to less than the maximum width if they deviate from the edge by more than a maximum deviation (MAXDEV), at which point (top point 2432) increments are no longer built. In one embodiment, MAXDEV is approximately 2 pixels wide. Once increments are maximized, the maximum height of the locator is established.

In step 2524, the width of the Locator in both directions from the line 2420 is established (MAXWIDTH1 and MAXWIDTH2). Typically, width is determined by a predetermined ratio of the height and by other factors, such as ensuring that a sufficient portion of the width is located in each of the object side and background side.

The procedure 2500 may attempt to move the Locator line 2420 upwardly or downwardly along the edge to seek a better fit within a predetermined limit (steps 2526 and 2528) that allows a truncated side (due to exceeding MAXDEV) of the Locator to expand in height. Likewise, in an embodiment, the line may be rotated relative to θ, to allow a better fit within certain rotational limits. Once the Locator positioning is established, the procedure 2500 in step 2530 ranks the strength of the transition of all edges within the original width of the Locator's ROI. In this example, a stronger (or equally strong) edge 2440 is identified (step 2532), which may confuse the analysis during runtime. Thus, the procedure 2500 resizes the width boundary 2442 (step 2534 and arrow 2441) to exclude the edge 2440. The amount (ADJWIDTH) of withdrawal of the Locator's width boundary 2442 may be calculated based upon a constant or a ratio relative to the distance between edges 2412 and 2440, or upon another metric. Finally the Locator is completed in step 2536.

Upon completion of the Locator's layout, a threshold value is assigned to the Locator. This value is calculated by deriving a measured magnitude (via the Sobel operator) of the edgelets at the edge line 2420 and multiplying this value by a constant to determine an absolute threshold value for the GUI. In an embodiment, a constant of 0.7 is used to establish a default value for the threshold assigned to the Locator, resulting in allowance of variation of up to 30%.

The placement and sizing of a detector in accordance with an embodiment of this invention is now described in further detail with reference to the exemplary object 2410 of FIG. 26 and respective procedure 2700 and graph 2800 of FIGS. 27 and 28.

Figure 26:
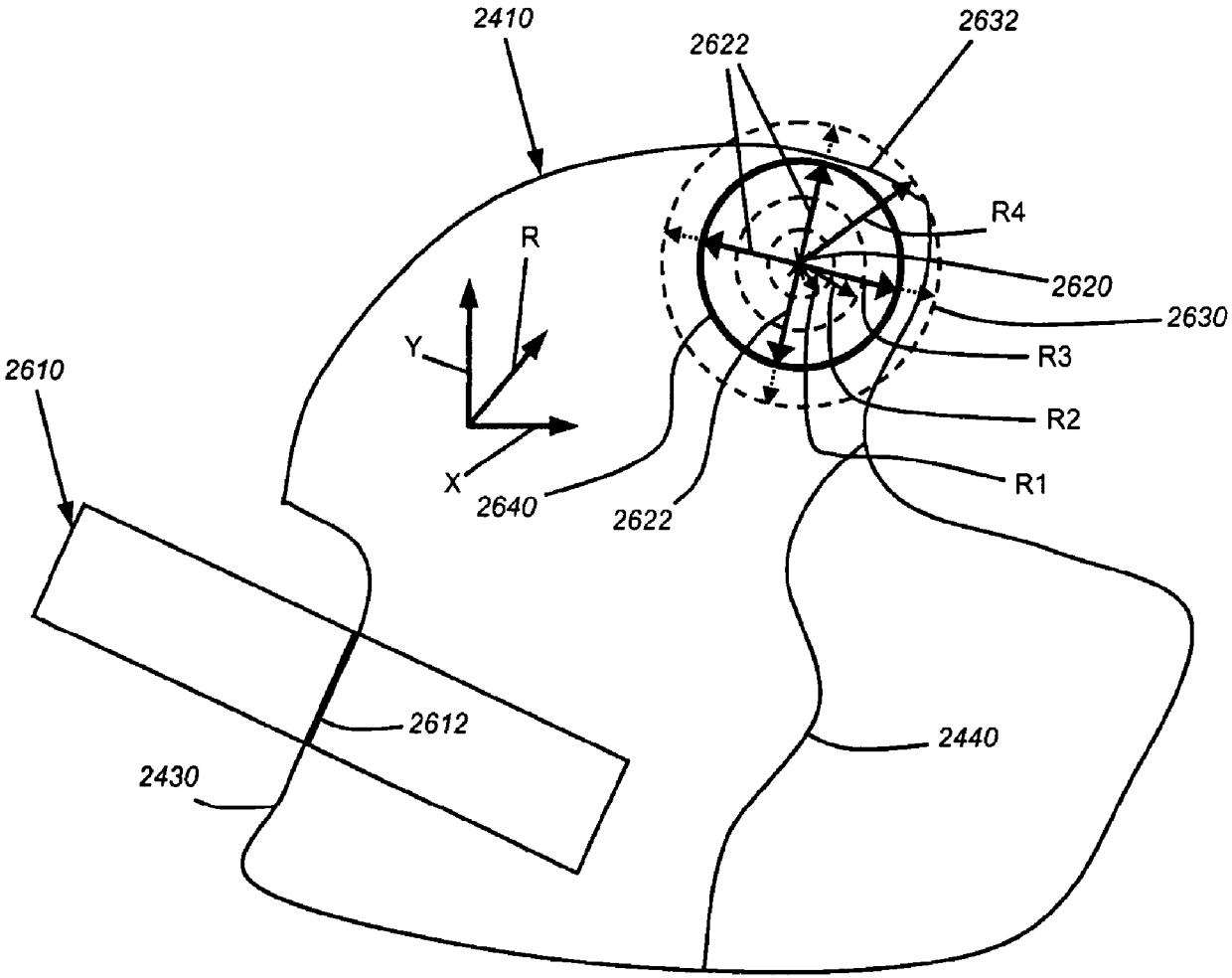
FIG. 26 is a schematic diagram of the exemplary object of FIG. 24 having multiple edges and the placement and sizing of a Detector ROI circle in response to the click of the cursor at a selected point on the object image view.

FIG. 26 shows the exemplary object 2410, as described with reference to FIG. 24 above, now having an established locator 2610 with plunger 2612 residing along the edge 2430. The user desires to place a Detector ROI circle at a predetermined point on the object 2410. The procedure 2700 (FIG. 27) for placing a Detector begins with the prior (previously described) step 2710 of locating all edge transitions within the image view, including internal transitions such as internal edge 2440, and assigning appropriate magnitudes to all edgelets derived from the associated convolution.

Next, in step 2712, the user moves the cursor to a point on the object image view and clicks the location to establish a center point (click point) 2620 for the Detector ROI circle (step 2714). This click point is established as the origin of the circle with an initial Radius equal to zero within the depicted x-axis and y-axis coordinate system. The procedure then (steps 2716 and 2718) begins to build a series of circles about the origin 2620, successively incrementing (typically by one or two pixels in distance per increment) the radius of the circle and deriving an average magnitude score for all points (or sum of all magnitudes) in the image view along the circle. In this example, the circles build successively outwardly (radial arrows 2622) from the origin 2620 to radiuses R1<R2<R3<R4. Each time the step 2718 decides whether the average or summed score of all image pixels within the given circle is (a) greater-than-or-equal-to, or (b) less-than the desired threshold value. Referring to the graph 2800 in FIG. 28, the average magnitude score (line 2810) remains above the minimum threshold level (dashed line 2812) until the score associate with R4 is attained. This corresponds on the example of FIG. 26 to the outer-most circle 2630 (shown in phantom), which resides in, part outside the object edge 2632. Thus, the procedure then selects (step 2720) the previous Radius value (R3) which generated a circle 2640 having an average/summed magnitude score still above the minimum threshold.

The GUI thus automatically displays the chosen circle with radius R3 and allows the user the option to increase or decrease the diameter as appropriate (step 2722). As described above, a further graphic image of a threshold and setting bar is provided alongside the completed circle.

The determination of magnitude is, in part based upon the type of tool used in conjunction with the Detector. In the case of brightness, the tool bases decisions upon pixel intensity versus a constant. The constant can be predetermined or calculated from the average image intensity in a variety of ways. In the case of contrast, the magnitude score may be a differential gradient between intensities and the threshold may be a constant gradient. Where needed, inverse values for these thresholds can be derived through subtraction from a constant. Automatic placement and sizing of a template circle may be based upon contrast or brightness (or both).

Hence, the above description provides useful and highly flexible mechanisms for allowing minimally trained persons to quickly employ a vision detector without the need of intensive human programming or labor in setup. The completed setup may be tested as needed, and by accessing various GUI screens through "Back" buttons and clicks upon the image's Locators and Detectors during test time, adjustments can be made to the Locators and Detectors, or new/replacement Locators and Detectors can be placed on the image view.

The foregoing has been a detailed description of illustrative embodiments of the invention. Various modifications and additions can be made without departing from the spirit and scope thereof. For example, while ROIs for Locators are shown as rectangles and Detectors are shown as circles, their ROIs may each define a different shape or a variety of selectable and/or customized shapes as needed. Likewise, while a particular form of HMI and GUI are shown, a variety of hardware and GUI expressions are expressly contemplated. For example, in alternate embodiments access to operating parameters may be through alternate display screens or boxes. Accordingly, this description is meant to be taken only by way of example, and not to otherwise limit the scope of the invention.

What is claimed is:

1. A system for placing and sizing on a Graphical User Interface (GUI) display at least one of Locators and Detectors comprising one or more processors implementing the steps of:

a GUI screen image view of an object derived from a vision sensor having a field of view in which the object is in relative motion thereto and a plurality of captured image frames of the object within the filed of view, the image view being accessible by a GUI cursor;

an edge detection process that determines and analyzes detectable edges in the screen image view and stores edge information;

a selector that allows a user to select either a (a) Locator or (b) a Detector based upon a predetermined analysis tool for placement on the image view; and an automatic placement process that uses the edge information to place the selected (a) Locator or (b) Detector at a position on the image view upon which the cursor points with a size that is determined based upon a location of adjacent edges of the object image view.

2. The system as set forth in claim 1 wherein the automatic placement process is constructed and arranged to place the Locator on the image view relative to a nearest adjacent edge of the image view and to adjust the Locator so as to avoid a stronger-magnitude more-distant edge.

3. The system as set forth in claim 2 wherein the automatic placement process is constructed and arranged to size a width of the Locator according to a predetermined value and reduce the width so as to avoid the stronger-magnitude more-distant edge.

4. The system as set forth in claim 2 wherein the Locator includes a height based upon a line segment fit within a predetermined deviation away from the nearest adjacent edge.

5. The system as set forth in claim 4 wherein the line segment is oriented at a relative angle with respect to a vertical and a horizontal axis within the image view so as to cause the line segment to fit with minimum deviation from the nearest adjacent edge.

6. The system as set forth in claim 2 wherein the Locator is selected to be oriented with respect to the direction of relative motion.

[7. The system as set forth in claim 2 wherein the Locator is selected to be oriented with respect to (a) the direction of relative motion, and at least one of (b) a direction transverse to the direction of relative motion and (c) a direction at an angle between (a) and (b).]

[8. The system as set forth in claim 2 wherein the Locator is adapted to be resized and rotated about a center point by dragging and dropping the cursor at predetermined locations on the Locator so as to allow manual resizing and reorienting of the Locator with respect to the nearest adjacent edge.]

[9. The system as set forth in claim 2 wherein operating parameters relating to a threshold for activating the Locator are displayed in an associated control box within the GUI.]

10. The system as set forth in claim 2 wherein the operating parameters are selectively displayed in the control box by operating the cursor upon the Locator.

[11. The system as set forth in claim 1 wherein the Detector is adapted to be selected based upon at least one of brightness, contrast and a trained template.]

12. The system as set forth in claim 1 wherein the automatic placement process is constructed and arranged to place the [Director] *Detector* on the image view relative to the position at which the cursor points so that a relative center of the Detector [as] *is* at the position at which the cursor points and an outer boundary of the [Director] *Detector* extends to a location that is within detected edges of the object image view.

[13. The system as set forth in claim 12 wherein the Detector is adapted to be selected based upon at least one of brightness, contrast and a trained template.]

[14. The system as set forth in claim 12 wherein operating parameters relating to a threshold for activating the Detector, brightness settings and contrast settings are displayed in an associated control box within the GUI and at a location adjacent to the Detector.]

[15. The system as set forth in claim 14 wherein the operating parameters are selectively displayed in the control box by operating the cursor upon the Detector.]

[16. The system as set forth in claim 12 wherein the outer boundary defines a circle and wherein the Detector is adapted to be resized in diameter about a center point by dragging and dropping the cursor relative to the outer boundary.]

17. A method for placing and sizing on a Graphical User Interface (GUI) display at least one of Locators and Detectors comprising one or more processors implementing the steps of the steps of:

displaying a GUI screen image view of an object derived from a vision sensor having a field of view in which the object is in relative motion thereto and a plurality of captured image frames of the object within the filed of view, the image view being accessible by a GUI cursor;

determining and analyzing detectable edges in the screen image view and stores edge information;

selecting either a (a) Locator or (b) a Detector based upon a predetermined analysis tool for placement on the image view; and placing automatically, using the edge information, the selected (a) Locator or (b) Detector at a position on the image view upon which the cursor points with a size that is determined based upon a location of adjacent edges of the object image view.

18. The method as set forth in claim 17 wherein the step of placing places the Locator on the image view relative to a nearest adjacent edge of the image view and to adjust the Locator so as to avoid a stronger-magnitude more-distant edge.

19. The method as set forth in claim 18 wherein the step of placing sizes a width of the Locator according to a predetermined value and reduces the width so as to avoid the stronger-magnitude more-distant edge.

20. The method as set forth in claim 18 wherein the Locator includes a height based upon a line segment fit within a predetermined deviation away from the nearest adjacent edge.

21. The method as set forth in claim 20 wherein the line segment is oriented at a relative angle with respect to a vertical and a horizontal axis within the image view so as to cause the line segment to fit with minimum deviation from the nearest adjacent edge.

22. The method as set forth in claim 18 wherein the Locator is selected to be oriented with respect to the direction of relative motion.

[23. The method as set forth in claim 18 wherein the Locator is selected to be oriented with respect to (a) the direction of relative motion, and at least one of (b) a direction transverse to the direction of relative motion and (c) a direction at an angle between (a) and (b).]

[24. The method as set forth in claim 18 further comprising resizing and rotating the Locator a center point by dragging and dropping the cursor at predetermined locations on the Locator so as to allow manual resizing and reorienting of the Locator with respect to the nearest adjacent edge.]

[25. The method as set forth in claim 18 further comprising displaying operating parameters relating to a threshold for activating the Locator in an associated control box within the GUI.]

26. The method as set forth in claim [25] *18* wherein the threshold for activating the Locator is automatically determined by computing a threshold value based upon a magnitude value relative to the nearest adjacent edge.

27. The method as set forth in claim [25] *18* further comprising displaying the operating parameters [are] selectively in the control box by operating the cursor upon the Locator.

[28. The method as set forth in claim 17 wherein the Detector is adapted to be selected based upon at least one of brightness, contrast and a trained template.]

29. The method as set forth in claim 17 wherein the step of placing places the [Director] *Detector* on the image view relative to the position at which the cursor points so that a relative center of the Detector [as] *is* at the position at which the cursor points and an outer boundary of the [Director] *Detector* extends to a location that is within detected edges of the object image view.

[30. The method as set forth in claim 29 further comprising selecting the Detector based upon at least one of brightness, contrast and a trained template.]

[31. The method as set forth in claim 29 further comprising displaying operating parameters relating to a threshold for activating the Detector, brightness settings and contrast settings in an associated control box within the GUI and at a location adjacent to the Detector.]

[32. The method as set forth in claim 31 further comprising selectively displaying the operating parameters in the control box by operating the cursor upon the Detector.]

[33. The system as set forth in claim 29 wherein the outer boundary defines a circle, and further comprising resizing the Detector in diameter about a center point by dragging and dropping the cursor relative to the outer boundary.]

*34. A system for placing at least one of a Locator and a Detector on a Graphical User Interface (GUI) display, the system comprising one or more processors performing the steps of:*

*providing an image view of an object derived from a vision sensor on the GUI display;*

*performing an edge detection process that identifies detectable object edges in the image view and stores edge information;*

*enabling selection of at least one of a (a) Locator and (b) a Detector for placement on the image view; and*

*automatically using the edge information to place the selected at least one of the (a) Locator and (b) Detector at a position on the image view with a size that is determined based upon edge information.*

*35. The system as set forth in claim 34 wherein the step of using the edge information to place one of a Locator and a Detector on the image view with a size based upon edge information includes determining the size based upon a location of adjacent edges of the object in the screen image.*

*36. The system as set forth in claim 34 wherein the step of placing one of a Locator and a Detector includes placing a Locator on the image view relative to a nearest adjacent edge of the image view and adjusting the Locator so as to avoid a stronger-magnitude more-distant edge.*

*37. The system as set forth in claim 36 wherein the step of placing one of a Locator and a Detector includes sizing a width of the Locator so as to avoid the stronger-magnitude more-distant edge.*

*38. The system as set forth in claim 36 wherein the Locator includes a height based upon a line segment fit within a predetermined deviation away from the nearest adjacent edge.*

*39. The system as set forth in claim 38 wherein the line segment is oriented at a relative angle with respect to a vertical and a horizontal axis within the image view so as to cause the line segment to fit with minimum deviation from the nearest adjacent edge.*

*40. The system as set forth in claim 36 wherein the Locator is selected to be oriented with respect to a direction of relative motion of the object within a field of view of the vision sensor.*

*41. The system as set forth in claim 36 wherein the Locator is selected to be oriented with respect to (a) a direction of relative motion of the object within a field of view of the vision sensor, and at least one of (b) a direction transverse to the direction of relative motion and (c) a direction at an angle between (a) and (b).*

*42. The system as set forth in claim 36 wherein the operating parameters are selectively displayed in a control box by operating the cursor upon the Locator.*

*43. The system as set forth in claim 34 wherein the Detector is adapted to be selected based upon at least one of brightness, contrast and a trained template.*

*44. The system as set forth in claim 34 wherein the step of placing one of a Locator and a Detector includes placing the Detector on the image view relative to the position at which a cursor points so that a relative center of the Detector is at the position at which the cursor points and an outer boundary of the Detector extends to a location that is within detected edges of the object in the image view.*

*45. The system as set forth in claim 44 wherein the operating parameters are selectively displayed in the a control box by operating the cursor upon the Detector.*

*46. A method for placing at least one of a Locator and a Detector on a Graphical User Interface (GUI) display, the method comprising one or more processors performing the steps of:*

*displaying an image view of an object derived from a vision sensor on the GUI display;*

*performing an edge detection process that identifies detectable edges in the image view and stores edge information;*

*selecting at least one of a (a) Locator and (b) a Detector for placement on the image view; and*

*using the edge information to automatically place the selected at least one of the (a) Locator and (b) Detector at a position on the image view with a size that is determined based upon the edge information.*

*47. The method as set forth in claim 46 wherein the step of using the edge information to place includes placing the Locator on the image view relative to a nearest adjacent edge of the image view and to adjust the Locator so as to avoid a stronger-magnitude more-distant edge.*

*48. The method as set forth in claim 47 wherein the step of using the edge information to place includes sizing a width of the Locator so as to avoid the stronger-magnitude more-distant edge.*

*49. The method as set forth in claim 47 wherein the Locator includes a height based upon a line segment fit within a predetermined deviation away from the nearest adjacent edge.*

*50. The method as set forth in claim 49 wherein the line segment is oriented at a relative angle with respect to a vertical and a horizontal axis within the image view so as to cause the line segment to fit with minimum deviation from the nearest adjacent edge.*

*51. The method as set forth in claim 47 wherein the Locator is selected to be oriented with respect to the direction of relative motion of the object in a field of view of the vision sensor.*

*52. The method as set forth in claim 47 wherein the threshold for activating the Locator is automatically determined by computing a threshold value based upon a magnitude value relative to the nearest adjacent edge.*

*53. The method as set forth in claim 47 further comprising displaying the operating parameters selectively in the control box by operating a cursor upon the Locator.*

*54. The method as set forth in claim 46 wherein the step of using the edge information to place includes placing the Detector on the image view relative to the position at which a cursor points so that a relative center of the Detector is at the position at which the cursor points and an outer boundary of the Detector extends to a location that is within detected edges of the object within the image view.*

* * * * *